United States Patent
Shimura

(10) Patent No.: US 10,462,497 B2
(45) Date of Patent: Oct. 29, 2019

(54) FREE VIEWPOINT PICTURE DATA DISTRIBUTION SYSTEM

(71) Applicant: DENTSU INC., Tokyo (JP)

(72) Inventor: Akihiro Shimura, Tokyo (JP)

(73) Assignee: DENTSU INC., Tokyo (JP)

( * ) Notice: Subject to any disclaimer, the term of this patent is extended or adjusted under 35 U.S.C. 154(b) by 61 days.

(21) Appl. No.: 15/570,129

(22) PCT Filed: Mar. 22, 2016

(86) PCT No.: PCT/JP2016/058913
§ 371 (c)(1),
(2) Date: Oct. 27, 2017

(87) PCT Pub. No.: WO2016/178340
PCT Pub. Date: Nov. 10, 2016

(65) Prior Publication Data
US 2018/0146218 A1 May 24, 2018

(30) Foreign Application Priority Data

May 1, 2015 (JP) ................................ 2015-094365

(51) Int. Cl.
*H04N 21/218* (2011.01)
*G06F 3/0481* (2013.01)
(Continued)

(52) U.S. Cl.
CPC ..... *H04N 21/21805* (2013.01); *G06F 3/0481* (2013.01); *H04N 21/2365* (2013.01);
(Continued)

(58) Field of Classification Search
CPC ................ G06F 3/0481; H04N 21/258; H04N 21/4402; H04N 21/472; H04N 21/44213;
(Continued)

(56) References Cited

U.S. PATENT DOCUMENTS

| 8,243,122 B2 | 8/2012 | Ishikawa et al. |
| 8,687,000 B2 | 4/2014 | Panahpour Tehrani et al. |

(Continued)

FOREIGN PATENT DOCUMENTS

| EP | 2621167 A1 | 7/2013 |
| JP | 2003-179908 A | 6/2003 |

(Continued)

OTHER PUBLICATIONS

International Search Report for International Application No. PCT/JP2016/058913, dated Jul. 19, 2016.
(Continued)

*Primary Examiner* — Chenea Davis
(74) *Attorney, Agent, or Firm* — Jason H. Vick; Sheridan Ross, PC

(57) ABSTRACT

[TASK] To provide a recommended viewpoint to a user who is not familiar with a switching operation for switching a viewpoint of a free viewpoint motion image.
[SOLUTION TO PROBLEMS]
When a user gives a switching instruction for switching a viewpoint and a viewpoint direction by user terminals 3a to 3n–1, the switching instruction is sent to a distribution computer 2. The distribution computer 2 stores the switching instruction for each user ID and for each content ID. The distribution computer 2 generates recommended projection characteristic data on the basis of a plurality of switching instructions for free viewpoint motion image data corresponding to its content ID. When a new distribution request for data corresponding to the content ID is received from the user terminal 3n, the distribution computer 2 distributes recommended projection characteristic data together with free viewpoint motion image data.

28 Claims, 17 Drawing Sheets

(51) Int. Cl.
*H04N 21/258* (2011.01)
*H04N 21/4402* (2011.01)
*H04N 21/472* (2011.01)
*H04N 21/6587* (2011.01)
*H04N 21/2365* (2011.01)
*H04N 21/431* (2011.01)
*H04N 21/442* (2011.01)

(52) U.S. Cl.
CPC ......... *H04N 21/258* (2013.01); *H04N 21/431* (2013.01); *H04N 21/4402* (2013.01); *H04N 21/44213* (2013.01); *H04N 21/472* (2013.01); *H04N 21/6587* (2013.01)

(58) Field of Classification Search
CPC ......... H04N 21/21805; H04N 21/2365; H04N 21/431; H04N 21/6587
See application file for complete search history.

(56) References Cited

U.S. PATENT DOCUMENTS

| | | | |
|---|---|---|---|
| 2003/0051256 A1 | 3/2003 | Uesaki et al. | |
| 2005/0041737 A1 | 2/2005 | Matsumura et al. | |
| 2007/0240183 A1* | 10/2007 | Garbow | H04N 7/163 725/38 |
| 2010/0259595 A1* | 10/2010 | Trimeche | H04N 21/21805 348/43 |
| 2013/0223537 A1 | 8/2013 | Kasai et al. | |
| 2014/0071131 A1 | 3/2014 | Kitago | |
| 2016/0269794 A1 | 9/2016 | Shimura et al. | |

FOREIGN PATENT DOCUMENTS

| | | |
|---|---|---|
| JP | 2005-215848 A | 8/2005 |
| JP | 2008-015756 A | 1/2008 |
| JP | 2008-211417 A | 9/2008 |
| JP | 2009-037301 A | 2/2009 |
| JP | 2009-177431 A | 8/2009 |
| JP | 2010-244221 A | 10/2010 |
| JP | 2014-041502 A | 3/2014 |
| JP | 2014-056466 A | 3/2014 |
| JP | 2015-015583 A | 1/2015 |
| JP | 5683756 B1 | 3/2015 |
| WO | WO 2012/039404 | 3/2012 |
| WO | WO 2015/049810 | 4/2015 |

OTHER PUBLICATIONS

Written Opinion for International Application No. PCT/JP2016/058913, dated Jul. 19, 2016.

International Preliminary Report on Patentability for International Application No. PCT/JP2016/058913, dated Nov. 16, 2017.

European Search Report for European Application No. 16789476.5, dated Nov. 6, 2018.

* cited by examiner

FIG.5A

INITIAL PERIOD

| TIME | VIEWPOINT | VIEWPOINT DIRECTION | ZOOMING |
|---|---|---|---|
|  | P1 | $\theta 1, \phi 1$ | — |

| ELAPSED TIME | VIEWPOINT | VIEWPOINT DIRECTION | ZOOMING |
|---|---|---|---|
| t0 | P1 | $\theta 1, \phi 1$ | — |
| t1 | P2 | $\theta 1, \phi 1$ | — |
| t2 | P3 | $\theta 1, \phi 1$ | — |
| t3 | P4 | $\theta 1, \phi 1$ | — |
| t4 | P5 | $\theta 1, \phi 1$ | — |

| ELAPSED TIME | VIEWPOINT | VIEWPOINT DIRECTION | ZOOMING |
|---|---|---|---|
| t0 | P1 | $\theta 1, \phi 1$ | — |
| t1 | P2 | $\theta 2, \phi 2$ | — |
| t2 | P3 | $\theta 3, \phi 3$ | — |
| t3 | P4 | $\theta 4, \phi 4$ | 2 |
| t4 | P5 | $\theta 5, \phi 5$ | 2 |

| ELAPSED TIME | VIEWPOINT | VIEWPOINT DIRECTION | ZOOMING |
|---|---|---|---|
| t0 | P1 | $\theta 1, \phi 1$ | — |
| t1 | P2 | $\theta 2, \phi 2$ | — |
| t2 | P3 | $\theta 3, \phi 3$ | 2 |
| t3 | P6 | $\theta 6, \phi 6$ | 2 |
| t4 | P7 | $\theta 7, \phi 7$ | 2 |

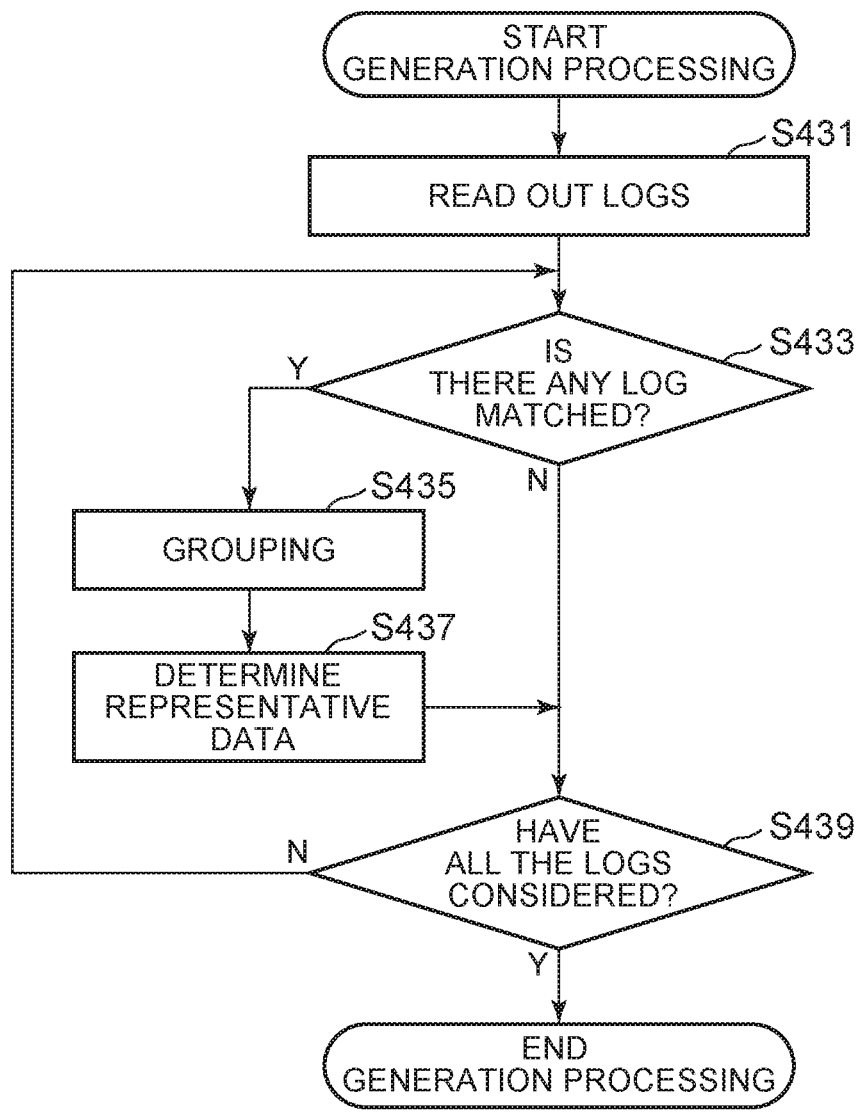

| ELAPSED TIME | VIEWPOINT | VIEWPOINT DIRECTION | ZOOMING |
|---|---|---|---|
| t1 | P2 | θ1, φ1 | — |
| t2 | P3 | θ1, φ1 | — |
| t3 | P4 | θ1, φ1 | — |
| t4 | P5 | θ1, φ1 | — |

| ELAPSED TIME | VIEWPOINT | VIEWPOINT DIRECTION | ZOOMING |
|---|---|---|---|
| t1 | P2 | θ1, φ1 | — |
| t2 | P3 | θ1, φ1 | — |
| t3 | P4 | θ4, φ4 | — |
| t4 | P5 | θ5, φ5 | — |

| ELAPSED TIME | VIEWPOINT | VIEWPOINT DIRECTION | ZOOMING |
|---|---|---|---|
| t1 | P2 | θ2, φ2 | — |
| t2 | P3 | θ3, φ3 | — |
| t3 | P4 | θ4, φ4 | 2 |
| t4 | P5 | θ5, φ5 | 2 |

| ELAPSED TIME | VIEWPOINT | VIEWPOINT DIRECTION | ZOOMING |
|---|---|---|---|
| t1 | P2 | θ2, φ2 | — |
| t2 | P3 | θ3, φ3 | — |
| t3 | P4 | θ4, φ4 | — |
| t4 | P5 | θ5, φ5 | — |

| ELAPSED TIME | VIEWPOINT | VIEWPOINT DIRECTION | ZOOMING |
|---|---|---|---|
| t1 | P12 | θ12, φ12 | — |
| t2 | P13 | θ13, φ13 | — |
| t3 | P4 | θ4, φ4 | 2 |
| t4 | P5 | θ5, φ5 | 2 |

| ELAPSED TIME | VIEWPOINT | VIEWPOINT DIRECTION | ZOOMING |
|---|---|---|---|
| t1 | P2 | θ2, φ2 | — |
| t2 | P3 | θ3, φ3 | — |
| t3 | P4 | θ4, φ4 | — |
| t4 | P5 | θ5, φ5 | — |

FREE VIEWPOINT PICTURE DATA DISTRIBUTION SYSTEM

CROSS REFERENCE TO RELATED APPLICATIONS

This application is a national stage application under 35 U.S.C. 371 of PCT Application No. PCT/JP2016/058913 having an international filing date of 22 Mar. 2016 which designated the United States, which PCT application claimed the benefit of Japanese Application No. 2015-094365 filed 1 May 2015, each of which are incorporated herein by reference in their entirety.

TECHNICAL FIELD

The present invention relates to a free viewpoint picture data distribution system. More particularly, the present invention relates to switching processing for switching a viewpoint to a recommended viewpoint.

BACKGROUND ART

Various proposals have been made on a free viewpoint image generation technique and a display technique for reproducing an image at an arbitrary position from motion images captured by a plurality of cameras (for example, see Patent Literatures 1 to 4, Non-Patent Literature 1, and Non-Patent Literature 2).

These methods are referred to as image-based rendering. More specifically, a light field is constructed from the images captured by a plurality of cameras, and based on this light field, an image viewed from an arbitrary position is generated by using interpolating processing.

Incidentally, construction of the light field is a process of correlating a light ray passing through a certain plane, expressed as a coordinate in the coordinate space and the pixel value of this coordinate space. It is impractical to prepare pixel value data for the entire coordinates in the coordinate space in advance. So, usually the pixel data are prepared for a certain part of the coordinate, and the rest are decided by interpolation.

In order to display the free viewpoint picture in an effective manner, the user needs to get used to the handling of switching process. Patent Literature 5 discloses a recommended display method in the free viewpoint image generation technique in which a plurality of operation histories (e.g., viewpoint condition and elapsed time) of users similar in static attribute (e.g., sex, age, etc.) is stored and an average operation history determined on the basis of the plurality of operation histories is distributed as a recommended operation history to the users similar in static attribute (paragraphs 0062-0064).

CITATION LIST

Patent Literature

Patent Literature 1: JP 2008-15756 A
Patent Literature 2: JP 2010-244221 A (U.S. Pat. No. 8,687,000 (B2))
Patent Literature 3: JP 2009-037301 A (U.S. Pat. No. 8,243,122 (B2))
Patent Literature 4: JP 2005-215848 A (U.S. Pat. No. 7,675,540 (B2), U.S. Pat. No. 8,189,036 (B2))
Patent Literature 5: JP 2014-41502 A

Non-Patent Literature

Non-Patent Literature 1: Takeshi Naemura, et al., "Ray-Based Creation of Photo-Realistic Virtual World", VSMM 97, pp. 59-62, September 1997
Non-Patent Literature 2: Michael Droese, et al., "Ray-Space Interpolation based on Filtering in Disparity Domain", Proc. of 3D Image Conference 2004, pp. 29-30, 2004

SUMMARY OF INVENTION

Technical Problem

In the recommended method disclosed in Patent Literature 5, however, what is selected as the recommended operation history is users having similarity in sex, age, and the like. Therefore, the selected operation history does not always match with a viewpoint condition to be proposed.

A purpose of the present invention is to provide a free viewpoint picture data distribution system capable of providing a recommended free viewpoint picture that better matches with the viewpoint condition.

Characteristics, other purposes, uses, effects, etc. of the present invention will become clear with reference to the embodiments and drawings disclosed herein/attached hereto.

DISCLOSURE OF THE INVENTION

Solution to Problem

1) A free viewpoint picture data distribution system according to the present invention includes: A) a distribution computer including: storage means for storing free viewpoint picture data capable of changing a viewpoint for viewing; and distribution means for distributing the free viewpoint picture data to a user terminal; and B) the user terminal including: receiving means for receiving the free viewpoint picture data; projection image generating means for generating, when projection characteristic data including a viewpoint and a viewpoint direction is given, specific viewpoint motion image data viewed from the viewpoint and the viewpoint direction for the free viewpoint picture data; display control means for causing display means to display the generated specific viewpoint motion image data; and projection image changing means for causing, when projection characteristic changing data for changing a projection characteristic for the specific viewpoint motion image data displayed on the display means is given from an operator of the user terminal, the projection image generating means to generate specific viewpoint motion image data based on the projection characteristic changing data, and for sending a history of the projection characteristic changing data to the distribution computer; C) wherein the distribution computer further includes: user-specific operation data receiving means for receiving the history of the projection characteristic changing data as user-specific operation data; user-specific operation data storage means for storing the received user-specific operation data; and recommended display condition determining means for determining user-specific operation data having a characteristic operation trend common in the plural pieces of user-specific operation data as target user-specific operation data for generating a recommended display condition, and for determining representative user-specific operation data on the basis of the target user-specific operation data; and D) wherein the distribution means distributes the recommended display condition together with the free viewpoint picture data.

Therefore, a recommended display by using representative user-specific operation data determined on the basis of user-specific operation data of other users can be enabled.

2) A free viewpoint picture data distribution system according to the present invention includes: A) a distribution computer including: storage means for storing free viewpoint picture data capable of changing a viewpoint for viewing; projection image generating means for generating, when a viewpoint and a viewpoint direction is given, specific viewpoint motion image data viewed from the viewpoint and the viewpoint direction for the free viewpoint picture data; and distribution means for distributing the specific viewpoint motion image data to a user terminal; and B) the user terminal including: receiving means for receiving the specific viewpoint motion image data; display control means for causing display means to display the specific viewpoint motion image data; and projection image changing means for giving, when a switching instruction for switching a viewpoint and a viewpoint direction for the specific viewpoint motion image data displayed on the display means is given from a user, the switching instruction to the distribution computer; C) wherein the distribution computer includes user-specific operation data receiving means for receiving a history of the switching instruction as user-specific operation data; and the projection image generating means generates new specific viewpoint motion image data on the basis of the switching instruction and causes the distribution means to distribute the generated new specific viewpoint motion image data; D) wherein the distribution computer further includes: user-specific operation data storage means for storing the received user-specific operation data; and recommended display condition determining means for determining user-specific operation data having a characteristic operation trend common in the plural pieces of user-specific operation data as target user-specific operation data for generating a recommended display condition, and for determining representative user-specific operation data on the basis of the target user-specific operation data; and E) wherein the distribution means distributes the specific viewpoint motion image data on the basis of the recommended display condition.

Therefore, a recommended display by using representative user-specific operation data determined on the basis of user-specific operation data of other users can be enabled.

3) In a free viewpoint picture data distribution system according to the present invention, if viewpoint change timing matches in a relative elapsed time from a start of playback, such user-specific operation data is determined as the target user-specific operation data. Therefore, a recommended display by using representative user-specific operation data determined on the basis of user-specific operation data operated at the same timing in a relative elapsed time from a start of playback can be enabled.

4) In a free viewpoint picture data distribution system according to the present invention, if at least one combination of a viewpoint and a viewpoint direction matches in a relative elapsed time from a start of playback among the plural pieces of user-specific operation data, such user-specific operation data is determined as the target user-specific operation data. Therefore, in the relative elapsed time, a recommended display by using representative user-specific operation data determined on the basis of user-specific operation data in which at least one combination of a viewpoint and a viewpoint direction matches can be enabled.

5) At a free viewpoint picture data distribution system according to the present invention, in a relative elapsed time from a start of playback, if zoom processing is performed at the same relative elapsed time among the plural pieces of user-specific operation data, such user-specific operation data is determined as the target user-specific operation data. Therefore, at the relative elapsed time, a recommended display by using representative user-specific operation data determined on the basis of the user-specific operation data having been subjected to zoom processing at the same relative elapsed time can be enabled.

6) In a free viewpoint picture data distribution system according to the present invention, at a relative elapsed time from a start of playback, if timing for changing a playback speed matches among the plural pieces of user-specific operation data, such user-specific operation data is determined as the target user-specific operation data. Therefore, at the relative elapsed time, a recommended display by using representative user-specific operation data determined on the basis of user-specific operation data with which playback speed change timing matches can be enabled.

7) In a free viewpoint picture data distribution system according to the present invention, at a relative elapsed time from a start of playback, if a viewpoint change history matches among the plural pieces of user-specific operation data, such user-specific operation data is determined as the target user-specific operation data. Therefore, at the relative elapsed time, a recommended display by using representative user-specific operation data determined on the basis of the user-specific operation data with which the viewpoint change history matches can be enabled.

8) In a free viewpoint picture data distribution system according to the present invention, if a change history of viewpoint direction also matches in addition to the viewpoint change history, such user-specific operation data is determined as the target user-specific operation data. Therefore, in the relative elapsed time, a recommended display by using representative user-specific operation data determined on the basis of the user-specific operation data with which the viewpoint direction further matches can be enabled.

9) In a free viewpoint picture data distribution system according to the present invention, the representative user-specific operation data is data including the more number of combinations matched among the plural pieces of target user-specific operation data. Therefore, a recommended display by using user-specific operation data including the more number of combinations matched can be enabled.

10) In a free viewpoint picture data distribution system according to the present invention, the representative user-specific operation data is an average of target user-specific operation data. Therefore, a recommended display by using the average of the user-specific operation data can be achieved.

11) In a free viewpoint picture data distribution system according to the present invention, the representative user-specific operation data is data including the less number of combinations matched among the plural pieces of the target user-specific operation data. Therefore, a recommended display by using the representative user-specific operation data including the less number of combinations matched can be achieved.

12) In a free viewpoint picture data distribution system according to the present invention, user-specific operation data of a user whose total number of pieces of user-specific operation data stored excesses a predetermined value is determined as the target user-specific operation data. Therefore, a recommended display by using operation data of a user who is familiar with a switching operation for switching a free viewpoint can be enabled.

13) In a free viewpoint picture data distribution system according to the present invention, user-specific operation data of a user whose total number of pieces of user-specific operation data among the user-specific operation data related to specific motion image data excesses a predetermined value is determined as the target user-specific operation data. Therefore, a recommended display by using operation data of a user who is familiar with a switching operation for switching a free viewpoint can be enabled.

14) In a free viewpoint picture data distribution system according to the present invention, user-specific operation data including a specific operation is determined as target user-specific operation data. Therefore, a recommended display by using operation data of a user who is familiar with a switching operation for switching a free viewpoint can be achieved.

15) In a free viewpoint picture data distribution system according to the present invention, the specific operation is a playback stop operation performed on a picture region by an input device. Therefore, a recommended display by using operation data of a user who is familiar with a switching operation for switching a free viewpoint can be achieved.

16) In a free viewpoint picture data distribution system according to the present invention, the specific operation is a rotation operation at a free viewpoint after the playback stop operation. Therefore, a recommended display by using operation data of a user who is familiar with a switching operation for switching a free viewpoint can be achieved.

17) In a free viewpoint picture data distribution system according to the present invention, the specific operation is a smooth tracking operation by the input device. Therefore, a recommended display by using operation data of a user who is familiar with a switching operation for switching a free viewpoint can be enabled.

18) In a free viewpoint picture data distribution system according to the present invention, the specific operation is a zoom-in operation. Therefore, a recommended display by using operation data of a user who is familiar with a switching operation for switching a free viewpoint can be enabled.

19) In a free viewpoint picture data distribution system according to the present invention, the specific operation includes a predetermined number of operations after the zoom-in operation. Therefore, a recommended display by using operation data of a user who is familiar with a switching operation for switching a free viewpoint can be enabled.

20) In a free viewpoint picture data distribution system according to the present invention, the specific operation takes more than a predetermined time period for the total operating time after the zoom-in operation. Therefore, a recommended display by using operation data of a user who is familiar with a switching operation for switching a free viewpoint can be enabled.

21) In a free viewpoint picture data distribution system according to the present invention, further, the user-specific operation data including a specific operation is determined as the target user-specific operation data. Therefore, a recommended display by using operation data of a user who is familiar with a switching operation for switching a free viewpoint can be enabled.

22) In a free viewpoint picture data distribution system according to the present invention, the system includes operation empirical value storage means for storing an operation empirical value for free viewpoint picture data; wherein the user-specific operation data of a user having the operation empirical value of more than a certain value is determined as the target user-specific operation data. Therefore, a recommended display by using operation data of a user who is familiar with a free switching operation for switching the free viewpoint by using other system can be enabled.

23) A free viewpoint picture data distribution device according to the present invention includes: storage means for storing free viewpoint picture data for generating, when a viewpoint and a viewpoint direction are given, specific viewpoint motion image data viewed from the given viewpoint and viewpoint direction; distribution means for distributing the free viewpoint picture data to a user terminal; user-specific operation data receiving means for receiving, when receiving a switching instruction for switching a viewpoint and a viewpoint direction given from an operator of the user terminal for the specific viewpoint motion image data received from the user terminal, a history of the switching instruction as user-specific operation data; user-specific operation data storage means for storing the received user-specific operation data; and recommended display condition determining means for determining user-specific operation data including a characteristic operation trend common in the plural pieces of user-specific operation data as target user-specific operation data for generating a recommended display condition, and for determining the same as a recommended display condition for the subsequent distribution on the basis of the target user-specific operation data; wherein the distribution means distributes the recommended display condition together with the free viewpoint picture data.

Therefore, a recommended display by using representative user-specific operation data determined on the basis of user-specific operation data of other users can be enabled.

24) A free viewpoint picture data distribution device according to the present invention includes: storage means for storing free viewpoint picture data capable of changing a viewpoint for viewing; projection image generating means for generating, when a viewpoint and a viewpoint direction are given, specific viewpoint motion image data viewed from the viewpoint and the viewpoint direction for the free viewpoint picture data; and distribution means for distributing the specific viewpoint motion image data to a user terminal; wherein the projection image generating means is a free viewpoint picture data distribution device for generating, when receiving a switching instruction for switching a viewpoint and a viewpoint direction from the user terminal, new specific viewpoint motion image data on the basis of the switching instruction and causes the distribution means to distribute the new specific viewpoint motion image data, wherein the projection image generating means further includes: user-specific operation data storage means for storing the received user-specific operation data; and recommended display condition determining means for determining user-specific operation data having a characteristic operation trend common in the plural pieces of user-specific operation data as target user-specific operation data for generating a recommended display condition, and for determining a recommended display condition for the subsequent distribution on the basis of the target user-specific operation data; and wherein the distribution means distributes the specific viewpoint motion image data on the basis of the recommended display condition.

Therefore, a recommended display by using representative user-specific operation data determined on the basis of user-specific operation data of other users can be enabled.

25) A specific viewpoint motion image data display device according to the present invention includes: receiving means for receiving free viewpoint picture data capable of changing a viewpoint for viewing; projection image generating means for generating, when projection characteristic data including a viewpoint and a viewpoint direction is given, specific viewpoint motion image data viewed from the viewpoint and the viewpoint direction for the free viewpoint picture data; display control means for causing display means to display the generated specific viewpoint motion image data; and projection image changing means for causing the projection image generating means to generate, when projection characteristic changing data for changing a projection characteristic is given by an operator for the specific viewpoint motion image data displayed on the display means, new specific viewpoint motion image data based on the projection characteristic changing data, and for transmitting a history of the projection characteristic changing data to a distribution computer.

Therefore, a recommended display by using representative user-specific operation data determined on the basis of user-specific operation data of other users can be enabled.

26) A specific viewpoint motion image data display program according to the present invention causes a computer to work as: receiving means for receiving free viewpoint picture data capable of changing a viewpoint for viewing; projection image generating means for generating, when projection characteristic data including a viewpoint and a viewpoint direction is given, new specific viewpoint motion image data viewed from the viewpoint and the viewpoint direction for the free viewpoint picture data; display control means for causing display means to display the generated specific viewpoint motion image data; and projection image changing means for causing the projection image generating means to generate, when projection characteristic changing data for changing a projection characteristic is given by an operator for the specific viewpoint motion image data displayed on the display means, specific viewpoint motion image data based on the projection characteristic changing data, and for transmitting a history of the projection characteristic changing data to a distribution computer.

Therefore, a recommended display by using representative user-specific operation data determined on the basis of user-specific operation data of other users can be enabled.

In the present specification, "matching" covers matching within a certain range of matching conditions, of course, in addition to perfect matching.

Projection characteristic changing data means changing data in a relative elapsed time from a start of projection at which at least one of a viewpoint, a viewpoint direction, and a combination thereof is changed. In the present embodiment, the projection characteristic changing data is composed of a combination of a viewpoint, a viewpoint direction, zooming, and a relative elapsed time. Here, zooming is not essential. Further, in a case where a motion image is played back only at a single viewpoint and in a single viewpoint direction from a start of playback to an end of playback, the projection characteristic changing data is composed of a single viewpoint and a single viewpoint direction. Still further, the projection characteristic changing data may include data for changing a projection characteristic other than the above-described data.

BRIEF DESCRIPTION OF DRAWINGS

FIGS. 5A to 5D illustrate a data structure of user-specific operation data.

FIG. 15 is a flowchart of target operation generating processing.

FIGS. 16A to 16F illustrate a data structure of user-specific operation data stored in a distribution server 2.

REFERENCE SIGNS LIST 1 free viewpoint picture distribution system
23 CPU
27 memory
123 CPU
127 memory

BEST MODE FOR CARRYING OUT THE INVENTION

Figure 1:
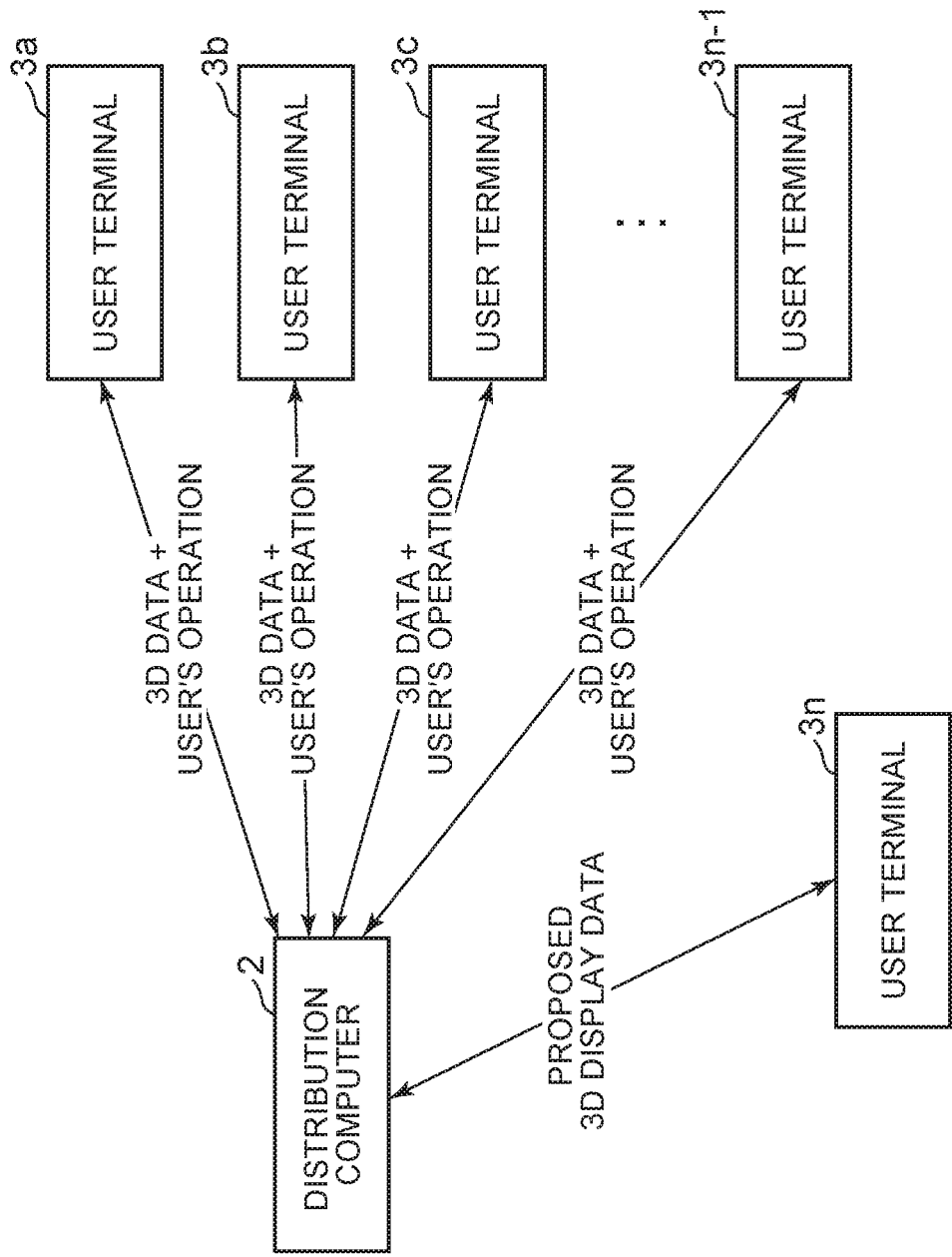
FIG. 1 schematically illustrates a free viewpoint picture distribution system 1.

Summary of Free Viewpoint Picture Distribution System 1 FIG. 1 illustrates a structure of a free viewpoint picture distribution system 1 according to the present invention. The free viewpoint picture distribution system 1 is configured with a distribution computer 2 and a plurality of terminal computers 3a to 3n.

The distribution computer 2 distributes projection characteristic data (viewpoint and viewpoint direction) for changing free viewpoint motion image data including a specified content ID and a viewpoint for viewing for each of user terminals 3a to 3n−1.

Each of the user terminals 3a to 3n−1 generates and displays a projection motion image on the basis of the received free viewpoint motion image data and projection characteristic data. When each user gives a switching instruction for changing a viewpoint and a viewpoint direction to each user terminal, each of the user terminals 3a to 3n−1 generates and displays a new projection motion image.

Each of the user terminals 3a to 3n–1 transmits the switching instruction to the distribution computer 2.

The distribution computer 2 stores the switching instruction for each user ID and for each content ID.

The distribution computer 2 generates recommended projection characteristic data on the basis of a plurality of switching instructions for free viewpoint motion image data having the same content ID. When a new request for distributing the content ID is received from a user terminal 3n, the distribution computer 2 distributes the recommended projection characteristic data to the user terminal 3n together with free viewpoint motion image data. Accordingly, even if a user of the user terminal 3n is unfamiliar with the switching of a viewpoint of a motion image, the user can view a projection motion image from the same viewpoint as other users are enjoying.

Function Block Diagram

Figure 2:
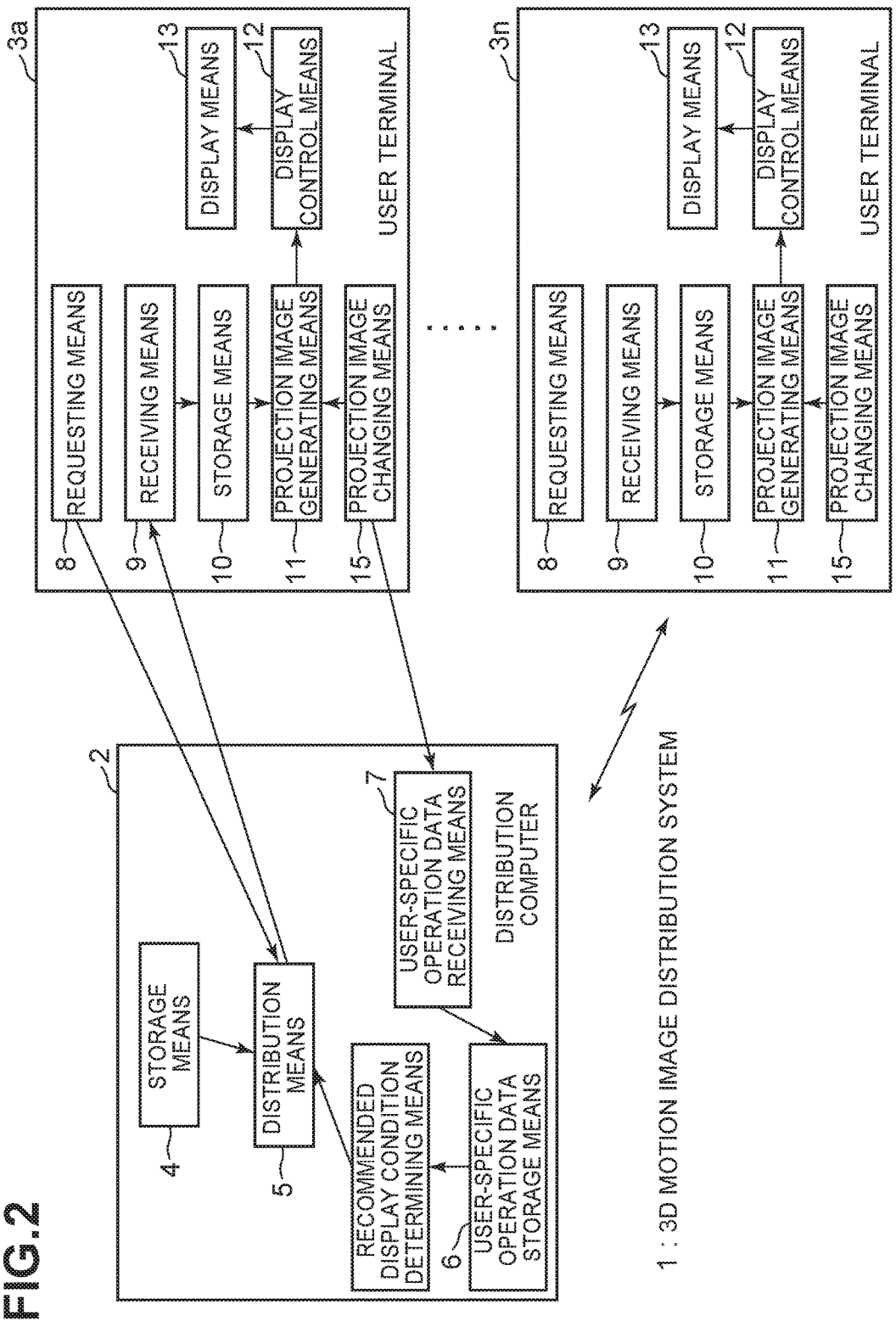
FIG. 2 is a function block diagram of the free viewpoint picture distribution system 1.

FIG. 2 is a function block diagram of the free viewpoint picture distribution system 1. The distribution computer 2 includes storage means 4, distribution means 5, user-specific operation data receiving means 7, user-specific operation data storage means 6, and recommended display condition determining means 3.

The storage means 4 stores plural pieces of free viewpoint picture data capable of changing a viewpoint for viewing. The distribution means 5 distributes when receiving a distribution request including specified free viewpoint picture data ID, the specified free viewpoint picture data to the user terminals 3a to 3n in response to whom requested the distribution request.

The user-specific operation data receiving means 7, the user-specific operation data storage means 6, and the recommended display condition determining means 3 will be described later.

The user terminal 3a is equipped with requesting means 8, receiving means 9, storage means 10, projection image generating means 11, the display control means 12, display means 13, and projection image changing means 15.

The requesting means 8 requests free viewpoint picture data to the distribution computer 2. The receiving means 9 receives free viewpoint picture data from the distribution computer 2. The storage means 10 stores the received free viewpoint picture data. The projection image generating means 11 generates, when a viewpoint and a viewpoint direction is given, specific viewpoint motion image data having the given view point and viewpoint direction by using the stored free viewpoint picture data. The display control means 12 controls the display means 13 and displays the generated specific viewpoint motion image data.

When projection characteristic changing data for changing a projection characteristic for the specific viewpoint motion image data displayed on the display means 13 is given from operators of the user terminals 3a to 3n, the projection image changing means 15 gives specific viewpoint motion image data changed based on the projection characteristic changing data to the projection image generating means 11, and transmits a history of the projection characteristic changing data to the distribution computer 2.

The user-specific operation data receiving means 7 of the distribution computer 2 receives the history of the projection characteristic changing data as user-specific operation data. The user-specific operation data storage means 6 stores the received user-specific operation data. The recommended display condition determining means 3 extracts a characteristic trend from the plural pieces of user-specific operation data and determines the extracted characteristic trend as a recommended display condition for the subsequent distribution.

When distributing free viewpoint picture data to a certain user terminal, the distribution means 5 distributes the determined recommended display condition together with the free viewpoint picture data. The user terminal, after receiving the recommended display condition and the free viewpoint picture data, gives such recommended display condition to the projection image generating means 11. The generated projection image is displayed on the display means 13 via the display control means 12.

Accordingly, it allows those users, who do not know which perspective will produce more attractive image, to display an optimal projection image by making full use of the free viewpoint picture data. For those users who already knew which perspective will produce interesting views, it gives more opportunity to display a fascinating view from an unintended viewpoint and viewpoint direction.

Incidentally, the other user terminals have the function identical to that of the user terminal 3a.

3. Hardware Configuration 3.1 Hardware Configuration of Distribution Computer 2

Figure 3:
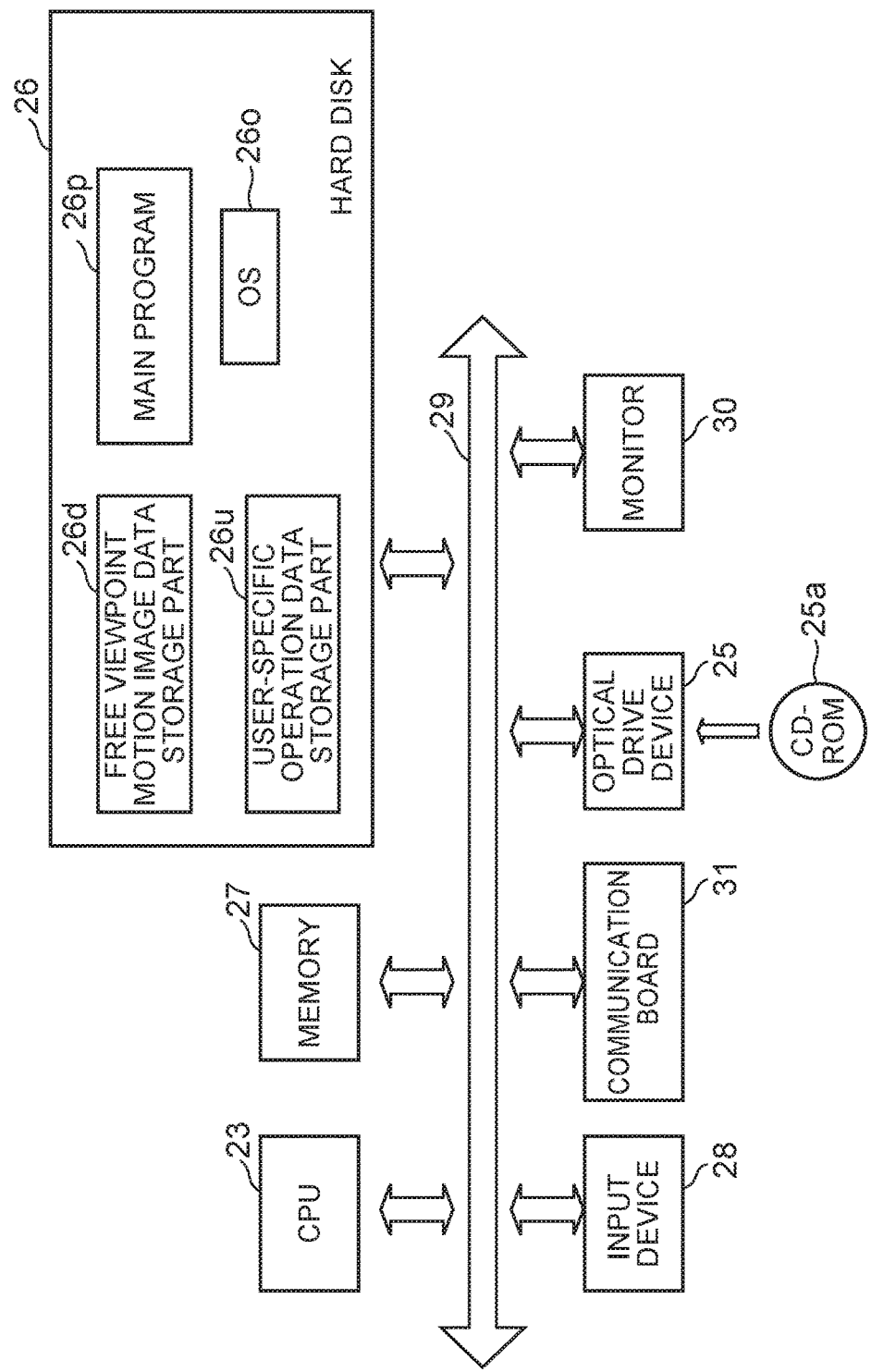
FIG. 3 illustrates a hardware configuration of a distribution computer 2.

The hardware configuration of the distribution computer 2 will be described below with reference to FIG. 3. FIG. 3 illustrates an example of the hardware configuration of the distribution computer 2 that includes a CPU.

The distribution computer 2 is equipped with a CPU 23, a memory 27, a hard disk 26, a monitor 30, an optical drive device 25, an input device 28, a communication board 31, and a bus line 29. The CPU 23 controls each part via the bus line 29 according to each program stored in the hard disk 26.

The hard disk 26 stores an operating system program 26o (hereinafter referred to as OS) and a main program 26p. When the main program 26p (processing of which will be described in detail later) receives a distribution request including a specified motion image ID from a user terminal, the main program 26p distributes free viewpoint motion image data corresponding to the motion image ID.

Figure 4:
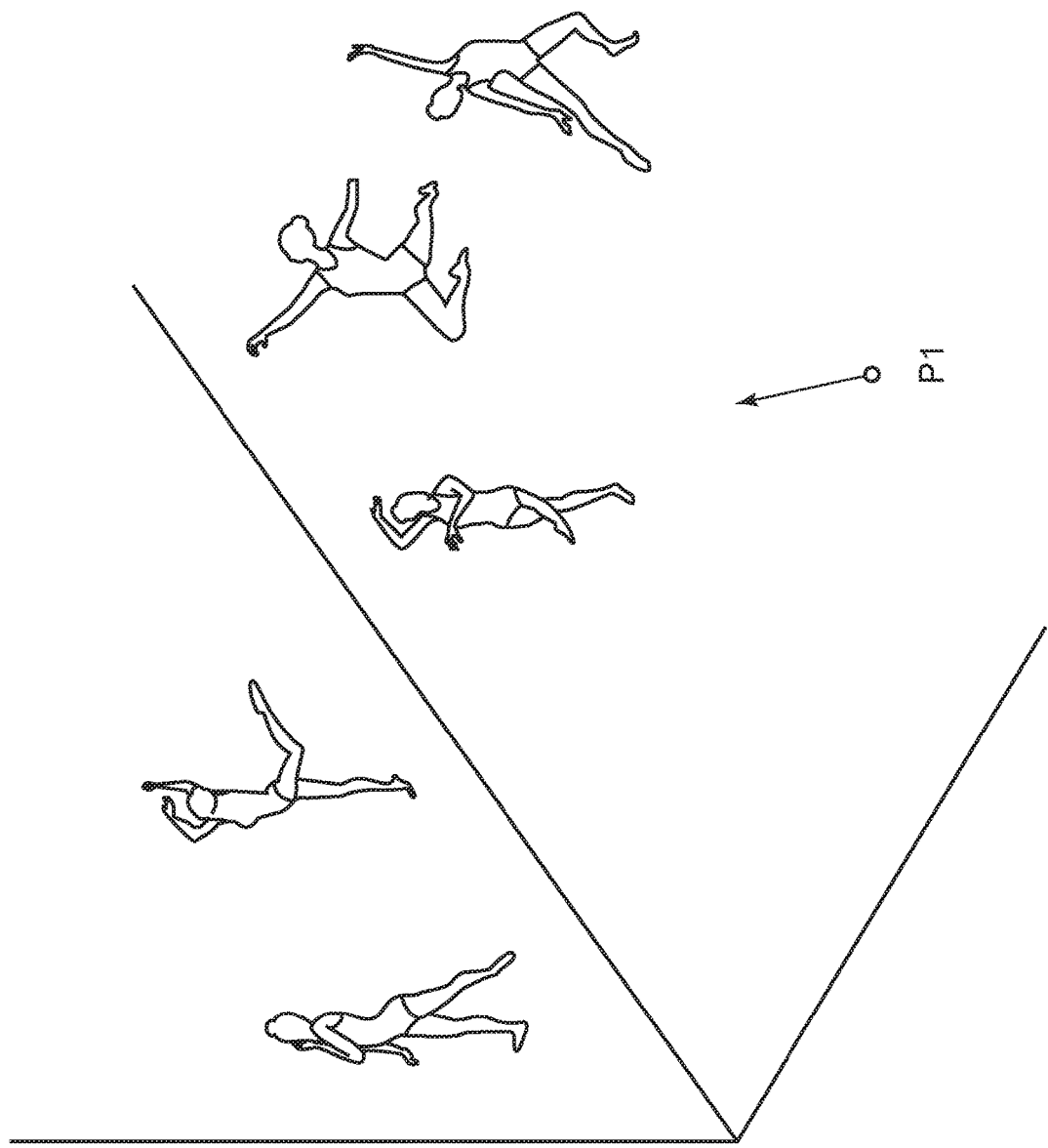
FIG. 4 illustrates an example of a free viewpoint motion image.

A free viewpoint motion image data storage part 26d stores a plurality of free viewpoint motion images. Each free viewpoint motion image includes a motion image data ID, a playback time, and an index word (not shown). FIG. 4 illustrates an example of a free viewpoint motion image. The example is a free viewpoint motion image in which a single dancer is dancing while moving in a XYZ coordinate system. Also this example is given with initial projection conditions so as to show the projection image from a viewpoint P1 and viewpoint directions $\theta 1$, $\varphi 1$ without zooming. In the present embodiment, the viewpoint direction was specified by a combination of a horizontal angle $\theta$ and an elevation angle $\varphi$. However, the viewpoint direction may be specified by other methods.

A user-specific operation data storage part 26u stores user-specific operation data as exemplified in FIG. 5 for each user and for each motion image ID. The user-specific operation data as exemplified in FIG. 5B stores a history of a viewpoint, a viewpoint direction, and zooming/non-zooming at an elapsed time from playback: for example, at an elapsed time t0, a viewpoint is P1, viewpoint directions are $\theta 1$, $\varphi 1$, and zooming is not used; at an elapsed time t1, a view point is P2, viewpoint directions are $\theta 2$, $\varphi 2$, and zooming is not used; and so on. Detailed description will be made later.

In the present embodiment, Windows 2008 R2 (Registered Mark or Trademark) is used as an operating system program (OS) 26o, but other operating systems may also be used.

Incidentally, the programs mentioned above are the ones, which are installed in the hard disc 26 after reading out from a CD-ROM 25a containing said programs. Here, in addition to the CD-ROM, programs may be carried by other computer readable mediums such as a flexible disk (FD) and IC card and then installed into a hard disk. Alternatively, programs may be downloaded via a communication line.

In the present embodiment, by installing a program from a CD-ROM to the hard disk 26, the program stored in the CD-ROM is indirectly executed by a computer. The present embodiment, however, should not be limited thereto. A program stored in a CD-ROM may be directly executed by the optical drive device 25. The program capable of being executed by a computer includes those, which are directly executed after being installed, which need to be converted before being installed (such as extraction of compressed data), and which are executable in combination with the other module parts.

3.2 Hardware Configuration of User Terminal 3

Figure 6:
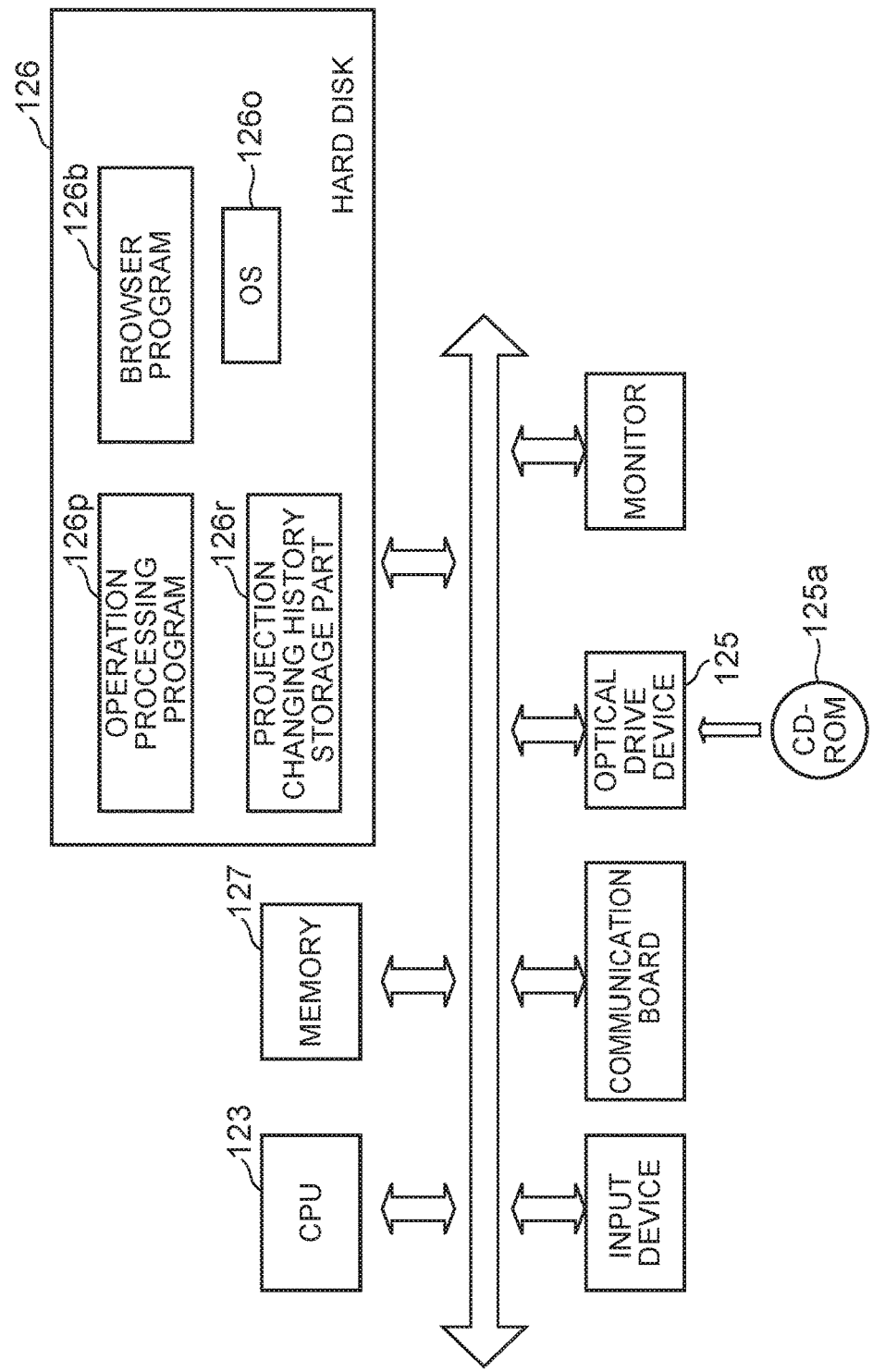
FIG. 6 illustrates a hardware configuration of user terminals 3a to 3n.

A hardware configuration of the user terminals 3a to 3n is illustrated in FIG. 6. The hard disk 126 stores a browser program 126b and an operation processing program 126p. When a CPU 123 displays a free viewpoint picture on a monitor 130 according to the browser program 126b, the CPU 123 stores a predetermined operation performed by the user on the basis of the operation processing program 126p in a projection changing history storage part 126r and transmits the predetermined operation to the distribution computer 2. The other structures are identical to those of a general personal computer, etc. The user terminal may be a tablet computer, a smartphone, a game machine, a smart TV, or the other home electric appliances.

Here, the operation processing program 126p is preliminarily stored in the hard disk 126. However, the operation processing may be executed by the browser program by means of plug-in process along with other necessary programs.

In the present embodiment, described is a case where the browser program 126P, the operation processing program 126p, and the projection changing history storage part 126r are stored in the hard disc 126. The location to be stored is not limited to the hard disc 126.

4. Flowchart (4.1 Free Viewpoint Motion Image Distributing Processing)

Figure 7:
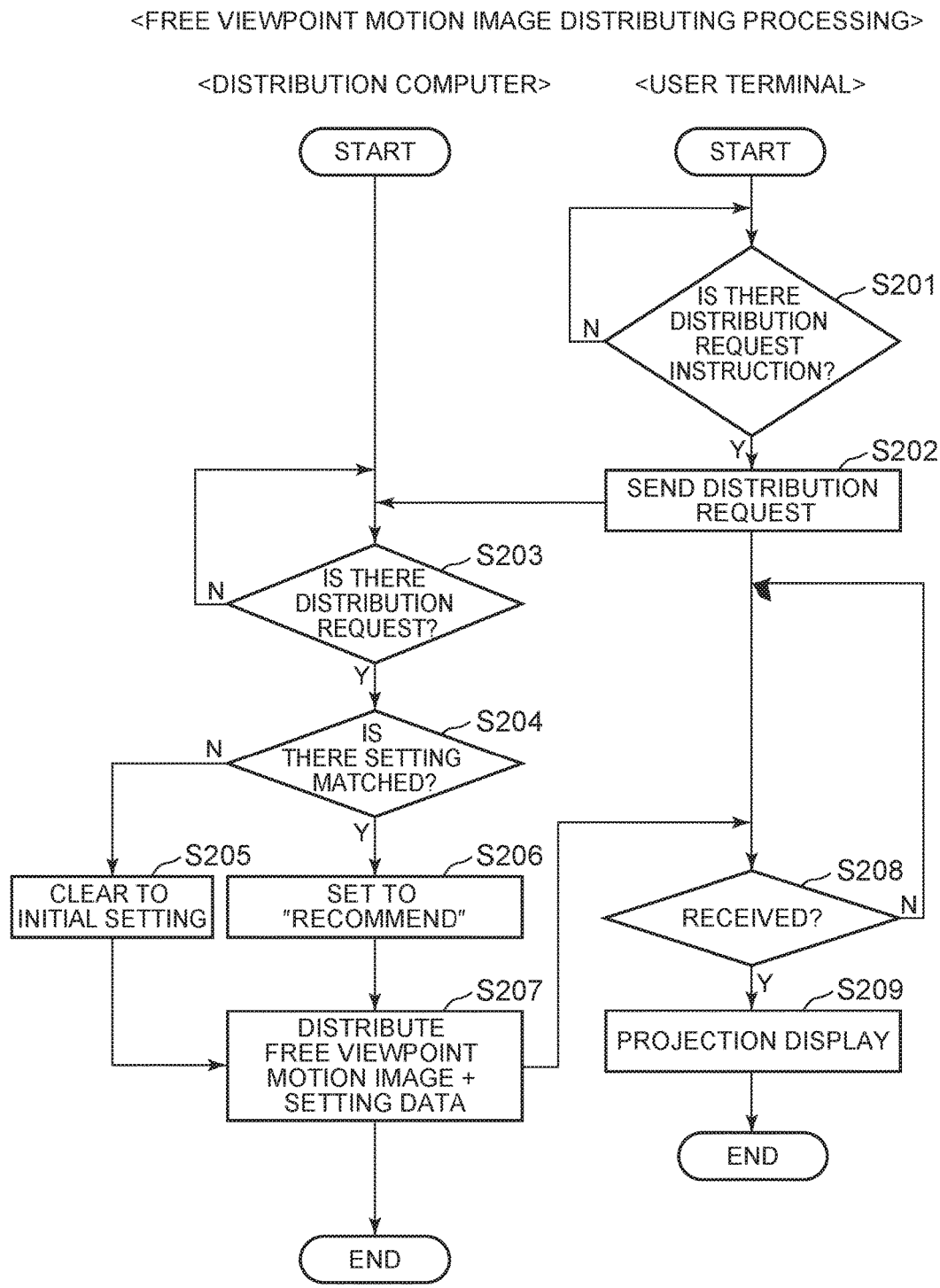
FIG. 7 is a flowchart of free viewpoint motion image distribution processing.

Now, free viewpoint motion image distribution displaying processing will be described with reference to FIG. 7.

Hereinafter, described will be processing performed after a user U10111 who uses the free viewpoint motion image distribution system for the first-time logs in the distribution server 2 with his or her ID and password and selects any one of a plurality of free viewpoint motion images.

The CPU 123 of the user terminal 3n determines whether or not there is a distribution request instruction received from the user (step S201) and, if there is the distribution request instruction, the CPU 123 transmits the distribution request to a distribution computer (step S202). The CPU 23 (see, FIG. 3) of the distribution computer determines whether or not there is a distribution request including a specified free viewpoint motion image ID from the user terminal 3n (step S203) and, upon receiving such distribution request, the CPU 23 determines whether or not the user of the user terminal 3n is the user to whom a recommendation is to be distributed (step S204).

Here, the user U10111 is a user who uses the free viewpoint motion image distribution system for the first time. Therefore, the CPU 23 sets "recommend" (step S206) and distributes a free viewpoint motion image and the set recommended data to the user terminal 3n (step S207).

Here, recommended data exemplified in FIG. 5C was set as the recommended setting.

The CPU 123 of the user terminal 3n determines whether or not the free viewpoint motion image is to be received (step S208) and performs projection processing by using the setting data when receiving the free viewpoint motion image (step S209).

Accordingly, a plurality of various free viewpoint motion image IDs are stored, a list of the free viewpoint motion image IDs is transmitted to a user terminal in response to a list request, the list is displayed by the user terminal, and the list can be distributed to the user terminal together with the setting data that recommends a specific free viewpoint motion image selected by the user.

Here, in a case where a determination that the user is not the one to whom recommended data is to be distributed is made in step S204, the setting is cleared to the initial setting (step S205) and processing of step S207 is executed. In the present embodiment, the initial setting was set to "a viewpoint P1, viewpoint directions $\theta1$, $\varphi1$, and no zooming" as shown in FIG. 5A.

(4.2 Projection Display Processing)

Figure 8:
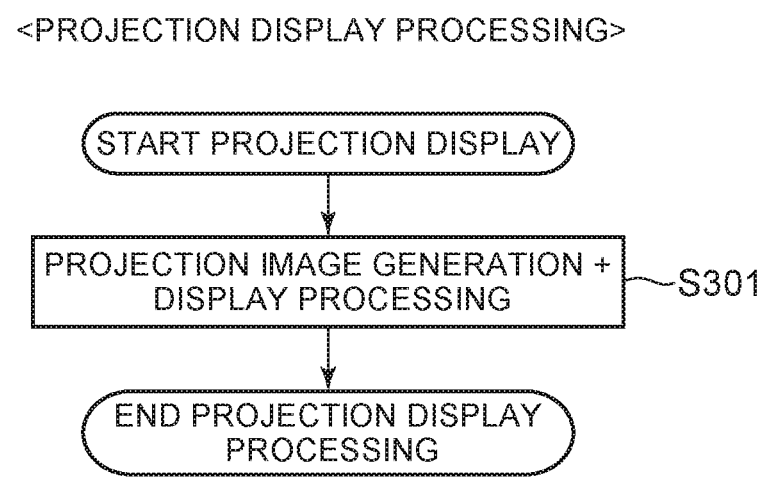
FIG. 8 is a flowchart of projection display processing.

Projection processing performed in step S209 will be described below. When a play button on a display screen (not shown) is selected, the user terminal 3 generates a projection image based on the distributed free viewpoint motion image data and the setting data to display the generated projection image on a monitor 130 (step S301 in FIG. 8).

Figure 9:
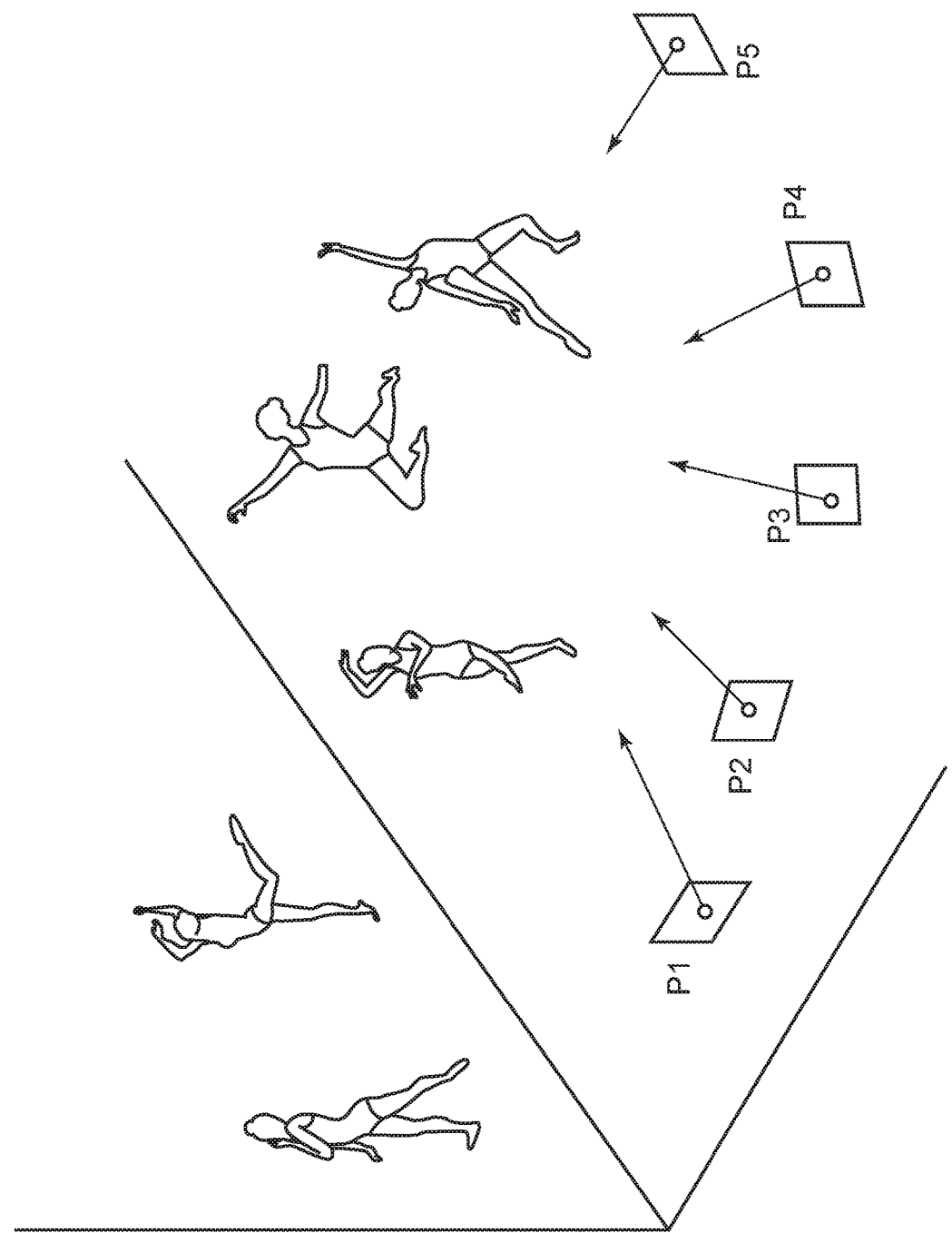
FIG. 9 illustrates an example of a free viewpoint picture displayed on a user terminal.

In this case, two-dimensionally projected data is generated on the basis of the projection characteristic data of FIG. 5C. The recommended data shown in FIG. 5C is data of a projection image viewed from a viewpoint P1 at time t0 in viewpoint directions $\theta1$, $\varphi1$, a projection image moved to a viewpoint P2 at time t1 in viewpoint directions $\theta2$, $\varphi2$, a projection image moved to a viewpoint P3 at time t2 in viewpoint directions $\theta3$, $\varphi3$, a projection image moved to a viewpoint P4 at time t3 in viewpoint directions $\theta4$, $\varphi4$ with 2-fold zooming, and a projection image moved to a viewpoint P5 at time t4 in viewpoint directions $\theta5$, $\varphi5$ with 2-folds zooming. In this case, if the target free viewpoint motion image is a motion image in which a single dancer is dancing while changing her position with time passage, as illustrated in FIG. 9, a projection motion image in which a viewpoint and a viewpoint direction are switched is displayed.

Incidentally, generation of a projection image based on a free viewpoint motion image can be carried out by utilizing a known coordinate conversion technique.

(4.3 Projection Changing Processing Performed by User)

In the user terminal 3, a projection image can be changed by the user performing desirable switching processing. In the present embodiment, by switching "viewpoint", "viewpoint direction", and "zooming/non-zooming", the projection image can be switched to be displayed. Such change of the projection image will be described below with reference to FIG. 11.

Figure 11A:
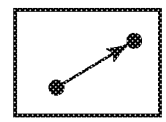
FIGS. 11A to 11D illustrates examples of operation buttons to be displayed on a user terminal.

Operation buttons illustrated in FIGS. 11A to 11D are displayed outside a display region where a projection motion image is displayed in the user terminal 3. The operation button shown in FIG. 11A does not change a two-dimensional plane on which a free viewpoint motion image is projected. The operation button of FIG. 11A is a moving mode button which moves a display region on a screen. More specifically, as illustrated in FIG. 9, it is a tracking mode that allows the user to see as if a viewpoint is moving horizontally. The moving amount is determined by the user designating it by the user with an input device.

Figure 11B:
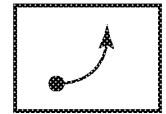
Figure 12:
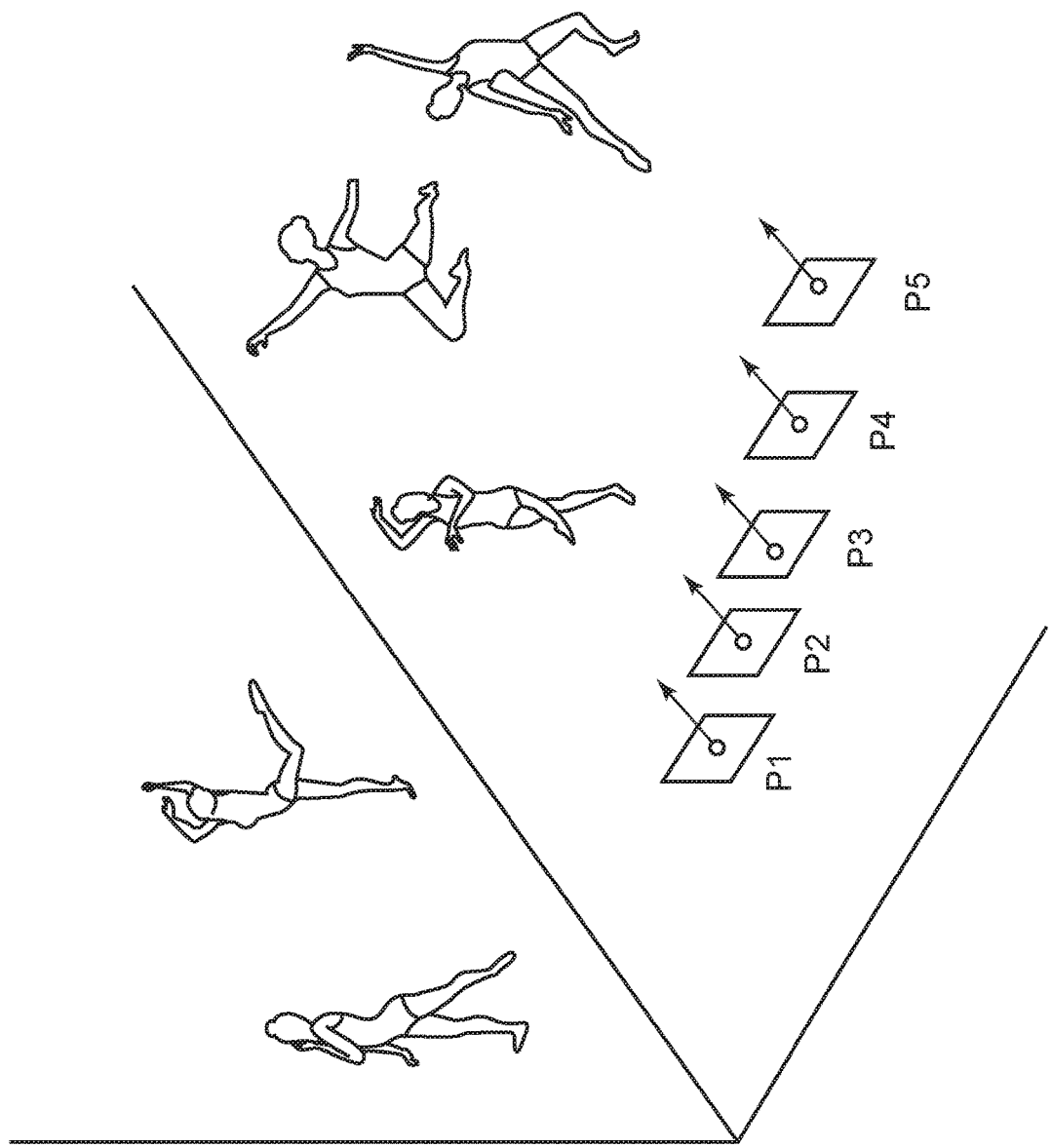
FIG. 12 illustrates an example of free viewpoint picture displayed on a user terminal.

The operation button shown in FIG. 11B turns on the mode, in which a two-dimensional plane on which a free viewpoint motion is projected changes along with the motion. In other words, it is the mode in which, a viewpoint is moved while being rotated about the specific axis in a free viewpoint space. A moving amount is determined by the user designating via an input device. For example, the user sees a projection motion image from each viewpoint as illustrated in FIG. 12.

Figure 11C:
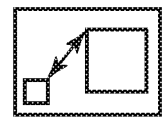
Figure 11D:
Figure 13:
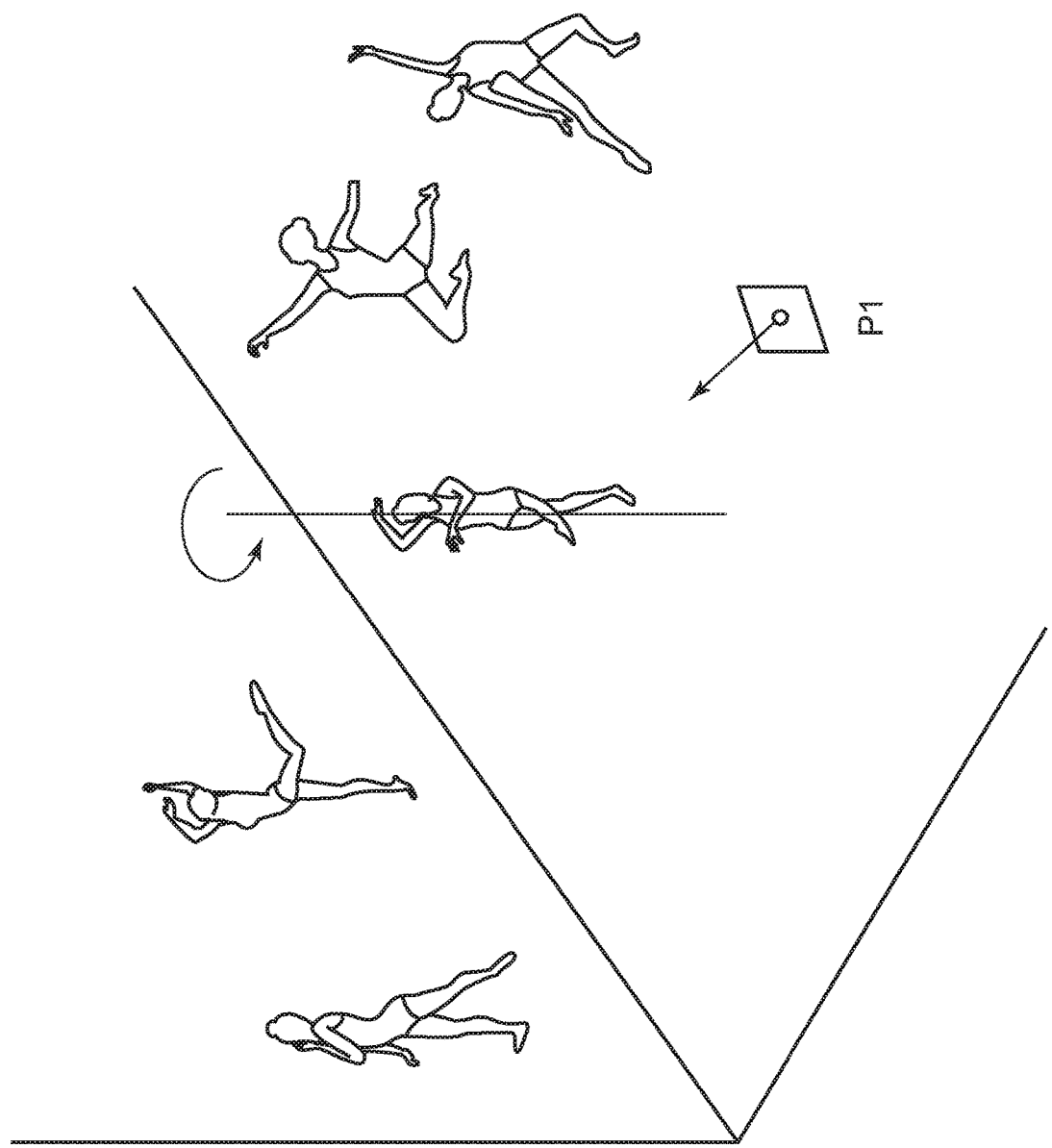
FIG. 13 illustrates rotation processing for spinning a target object in free viewpoint picture.

An operation button shown in FIG. 11C is a zoom in/zoom out button for zooming a screen. A zoom-in amount and a zoom-out amount are determined by the user designating via an input device. An operation button shown in FIG. 11D is a rotation mode button by which the user designates an object on the screen to rotate in a manner as illustrated in FIG. 13. The user can set the rotation axis anywhere and rotate the spinning axis. Such operation can be performed when the user wishes the motion which the original motion image does not contain.

Described will be a change of a projection image when one of the operation buttons is selected while the free viewpoint motion image is played back. The following description is made on a case where the user who plays back the free viewpoint motion image under the projecting condition of FIG. 5C keeps his viewpoint the same at time t2 at 2× zoom-up, then, changes his viewpoint to a viewpoint P6 at time t3 and, subsequently, to a viewpoint P7 at time t4.

Figure 10:
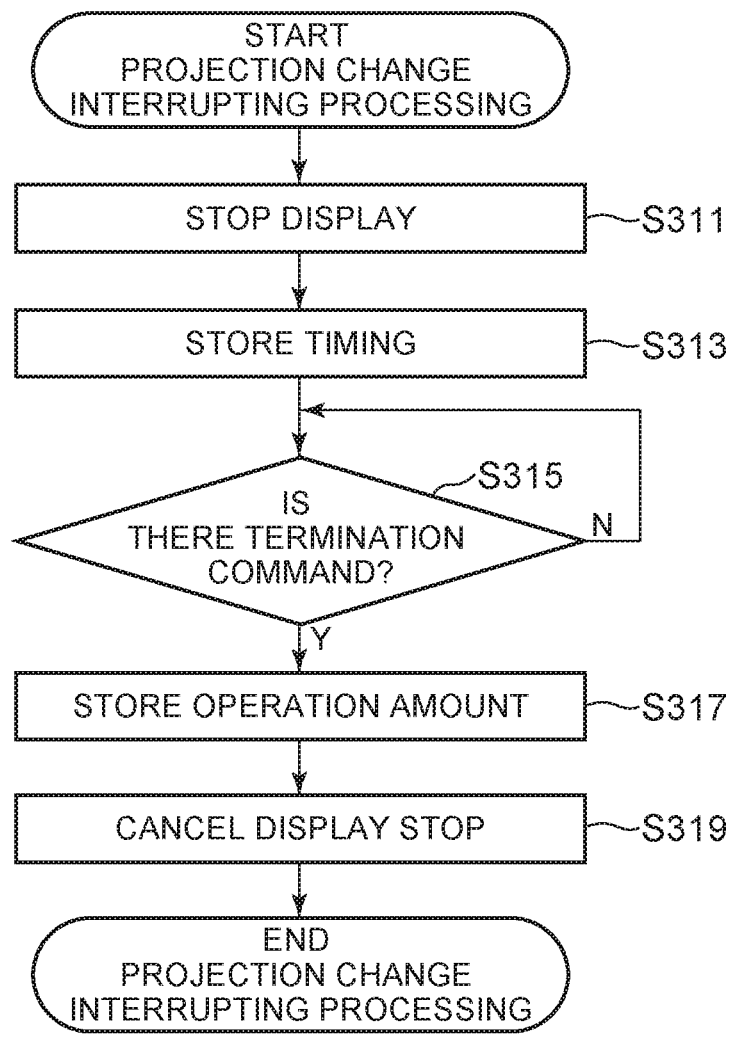
FIG. 10 is a flowchart of projection change interrupting processing.

The user operates a projection change interrupting processing button (not shown) when the viewpoint is switched to a viewpoint P3 at time t3 in viewpoint directions θ1, φ1. In the present embodiment, a right-click of mouse is assigned to perform an operation on the projection change interrupting processing button. Assignment of the function to buttons may be arranged in any ways. Accordingly, a projection change interrupting processing illustrated in FIG. 10 starts. The CPU 123 stops playback display (step S311 in FIG. 10) and stores the timing when the projection change interrupting processing button was selected (step S313). In the present embodiment, the selected timing is stored in the form of an elapsed time starting from the playback of motion image but may be stored in the form of the number of frames.

The operator of the user terminal 3 operates the zoom button as shown in FIG. 11C and gives a zoom amount to the user terminal 3. Because only processing desired here is zooming processing, the user gives an interruption processing termination command. In the present embodiment, if a right-click of a mouse is performed again in such interruption mode, the interruption processing termination command is given. However, other ways of processing may be chosen.

The CPU 123 determines whether or not such termination command is given (step S315), and if such instruction is given, an operation amount is stored (step S317). In this case, specifically, "2× zoom" is stored at time t2. The CPU 123 cancels the display stop (step S319) to end the projection change interrupting processing.

Accordingly, the motion image is played back. Then, the user operates the projection change interrupting processing button (not shown) at time t3. The user switches the projection condition to a viewpoint P6 in viewpoint directions θ6, φ6 with 2× zoom-up. The user ends the projection change interrupting processing and switches the projection condition at time t4, in a similar manner, to a viewpoint P7 in viewpoint directions θ7, φ7 with 2× zoom-up.

Accordingly, user-specific operation data shown in FIG. 5D is stored in the user terminal.

(4.4 Projection Changing Data Transmission Processing)

Figure 14:
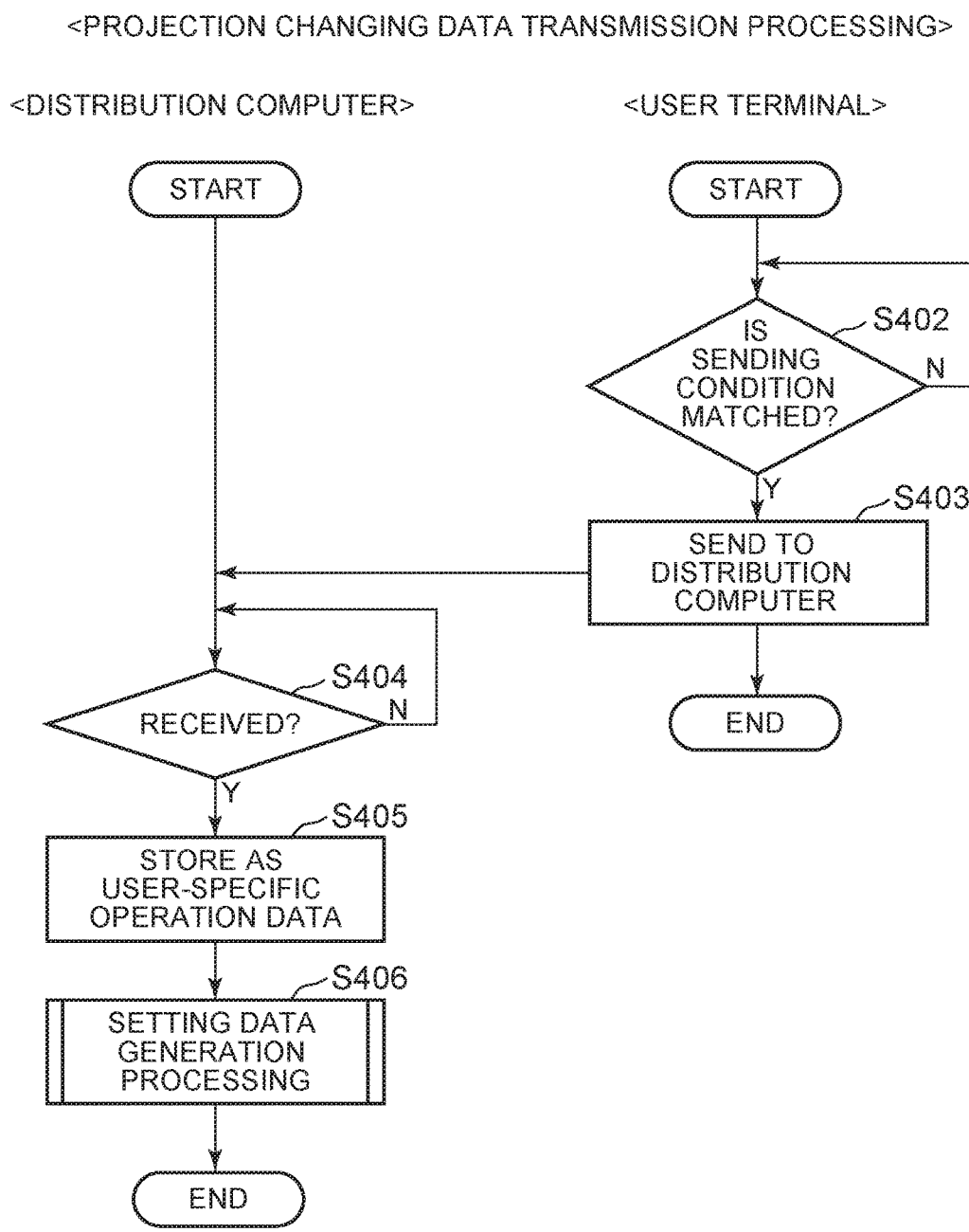
FIG. 14 is a flowchart of transmission processing for transmitting projection changing data.

With reference to FIG. 14, processing for transmitting such projection change processing to the distribution computer will be described below.

The CPU 123 of the user terminal determines whether or not the projection change processing matches with the transmission condition (step S402) and, if matches, transmits the projection change processing to the distribution computer (step S403). In the present embodiment, an elapsed time after storage is employed as a transmission condition, and after the elapse of a predetermined time, the CPU transmits the projection change processing from the user terminal to the distribution computer. The transmission condition is not limited to the above-described conditions. A time when viewing the free viewpoint motion image is ended and a time when a specific operation is performed may also be employed as a transmission condition.

Alternatively, the distribution computer may ask the user terminal if there is any history to be transmitted to the distribution computer and the user terminal may determine in response thereto.

The CPU 23 of the distribution computer determines whether or not such history is received (step S404) and, if received, the received history as user-specific operation data is stored (step S405).

The CPU 23 of the distribution computer performs setting data generation processing (step S406).

It may be configured such that the user-specific operation data is not transmitted if the user-specific operation data stays unchanged as being recommended from the distribution server.

(4.5 Setting Data Generation Processing)

Setting data generation processing will be described below with reference to FIG. 15.

The CPU 23 reads out all the logs (step S431 in FIG. 15). Subsequently, the CPU 23 determines whether or not there is a log to which dynamic user operation attribute matches (step S433).

The dynamic user operation attribute is an attribute specified by operation data that the user performed in the past. In the present embodiment, the following three conditions are employed as the dynamic user operation attribute: 1) a viewpoint and switched timing thereof match, 2) zoomed timing matches, and 3) moving histories of a plurality of viewpoints and view directions match. The conditions are not limited thereto but the conditions may be determined by the other operation data attribute. For example, the conditions may be determined, with an additional playback speed change button, by whether or not timing thereof matches.

For example, as shown in FIG. 16, there are pieces of user-specific operation data ID0001 to 0006 for a certain free viewpoint motion image data. Here, the user-specific operation data ID0001, ID0002, ID0003, ID0004, and ID0006 have the same viewpoint at elapsed times t1, t2, so the condition 1) therebetween is satisfied.

The CPU 23 performs grouping of the user-specific operation data whose dynamic user operation attribute match (step S435 in FIG. 15). Here, such data is assumed to be grouped as a group G1.

As described above, grouping means that, among the stored plural pieces of user-specific operation data, pieces of user-specific operation data having a common characteristic are extracted to be grouped.

The CPU 23 determines representative data from thus grouped user-specific operation data (step S437). In the present embodiment, data of a large distribution number is determined as the representative data in view of matched commonality. Various operation methods can be used here. In the present embodiment, an elapsed time, viewpoint coordinates, a value of a viewpoint direction, and zooming are set as n-dimensional vectors, and similarity of such n-dimensional vectors is obtained to select the largest number of pieces of user-specific operation data. For example, in group G1, ID0004 and ID0006 are identical in such n-dimensional vectors and thus they are determined as representative data of the group G1.

Meanwhile, similarity between vectors can be calculated by obtaining vectors. Weighting may further be performed.

Meanwhile, the representative data may be determined on the basis of an average of matched similarities or, reversely, on the basis of the less distribution number. If the representative data is selected on the basis of the less distribution number, recommendation from various viewpoints can be made.

The CPU 23 determines whether or not all the logs have been taken into consideration (step S439 in FIG. 15). Hereinafter, similarly, the user-specific operation data ID0003 and ID0005 have the same zoom timing at elapsed times t3, t4 and satisfy the condition 2), so they are grouped as a group G2 and representative data is determined therefrom. The user-specific operation data ID0003 and ID0004 have the same viewpoints and viewpoint directions at elapsed times t1 to t4 and satisfy the condition 3), so they are grouped as a group G3 and representative data is determined therefrom.

The user-specific operation data ID0001 and ID0002 have the same viewpoints and viewpoint directions at elapsed times t1, t2 and satisfy the condition 3), so they are grouped as a group G4, and representative data is determined therefrom.

Further, the user-specific operation data ID0002 to ID0005 have the same viewpoints and viewpoint directions at elapsed times t3, t4 and satisfy the condition 3), so they are grouped as a group G5 and representative data is determined therefrom.

Incidentally, matching of timing does not have to be a complete match. Some deviation may be allowed. For example, a deviation of 0.2 sec. may be determined as being a match. Such a deviation range may be a determined time or a predetermined percentage of a playback time of free viewpoint motion image data.

Further, it is not necessary that all the timings are matched. More specifically, if part of the timings matches, for example, if a viewpoint matches at an elapsed time tn, it can also be determined as matching.

The same is applied to coordinates of a viewpoint and viewpoint directions θ and φ. In this case, also, the range may be fixed regardless of a type of free viewpoint motion image data or may be varied according to a free viewpoint motion image data. As described above, the range may be changed according to the free viewpoint motion image data. This is because there is a case where a coordinate region in free viewpoint motion image data is wide (broadcasting of soccer game, etc.) or a case where a coordinate region in free viewpoint motion image data is narrow like a case of a chess game.

The determination may be made based on the criteria whether both of a viewpoint and a viewpoint direction match or whether one of a viewpoint and a viewpoint direction matches.

In the present embodiment, a dynamic user operation attribute is employed for grouping, but a static user attribute may be added for grouping. The static user attribute includes, for example, age, sex, something interested in, etc.

As described above, if a user group composed of users similar in static attributes such as age, a user group composed of users similar in dynamic viewing trend attribute that changes according to viewing, and an attribute of content viewed in the past (e.g., attribute of preferring to watch soccer games) are employed, operation histories between users similar in trend can be distributed as a recommendation.

For example, users who like a specific baseball team can refer to the operation histories of the user group composed of users having the same attribute for baseball teams.

Further, when switching the viewpoint and the viewpoint direction, the grouping may be performed on the basis of a time of day as a parameter. For example, in a case where there is such a trend that a viewpoint and a viewpoint direction of a certain free viewpoint motion image is switched at a certain time of day, it is possible to perform switching when reaching such a time of day.

In the above-described embodiment, one piece of user-specific operation data might belong to a plurality of groups. It is, however, optional whether or not the one piece of user-specific operation data belongs to the plurality of groups. It is also possible to let the one piece of user-specific operation data belong to only one group.

Incidentally, in the above-described example, with reference to viewing actions of some users, other user's screen arrangement was changed. It is also possible that the other user's screen arrangement may be changed with reference to the viewing operation history of their own. For example, it is also possible that, in a free viewpoint motion image of a soccer game, a frequency of switching of display by operating the motion image around a goal post is stored as a parameter and such screen arrangement may be distributed to a user who switches his viewpoint frequently in soccer game when distributing screen arrangement. In this case, an attribute tag is attached to each individual viewpoint for the reference sake.

As described above, two-dimensionally projected data in a user terminal of a specific user can be dynamically changed on the basis of user-specific operation data of a third party or the user himself.

Now, on the basis of the user's viewing action, a user terminal can also propose a screen arrangement of a free viewpoint motion image distribution that the user is deeply interested in.

(4.6 Classified Processing)

In the above-described embodiment, the grouping was performed on the basis of similarities for all the users but there is a case where some operations only happen to match with no intentional operation being made. It is preferable that such unnecessary data is eliminated as much as possible.

Figure 17:
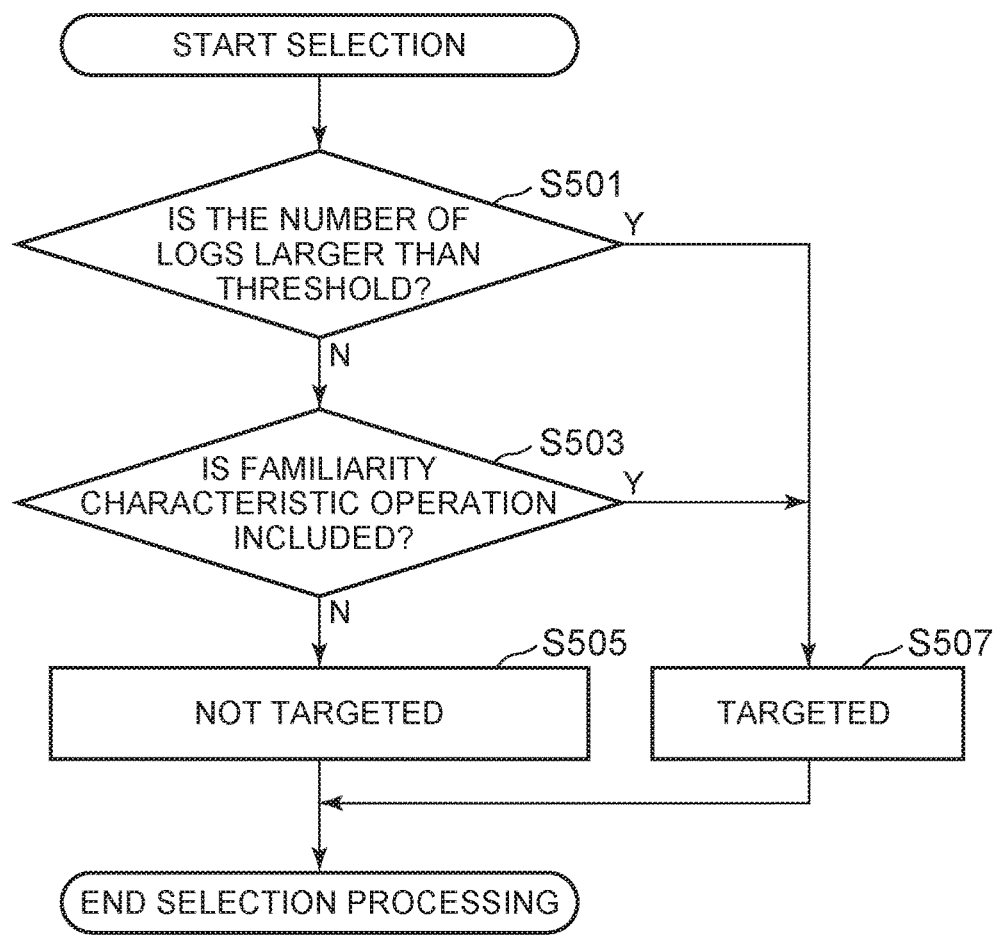
FIG. 17 is a flowchart of selection process of a target user.

In this case, with processing for selecting a target user as shown in FIG. 17 being performed by a distribution server, the unnecessary data can be eliminated.

The CPU 23 determines whether or not the total number of logs stored with respect to the user is larger than a threshold (step S501). In the present embodiment, the threshold is set to, but not limited to, less than 30.

In a case where the total number of logs is larger than the threshold, the CPU 23 sets an individual operation history of the user as a target for grouping (step S507). That is, when the number of histories more than a certain criterion is stored, it can be determined that the user is familiar with the operation.

If the CPU 23 determines that the total number of logs is not more than the threshold in step S501, then the CPU 23 determines whether or not a familiarity characteristic operation is included (step S503). The familiarity characteristic operation is an operation capable of determining if the user is familiar with the switching of a viewpoint of a free viewpoint motion image while performing the operation. In the present embodiment, "playback stop by selecting a motion image region and, further, the number of rotation operations or a time period for the total spinning operation excesses the threshold", "an operation tracking is smooth", and "the number of operations or a time period for the total operation after zoom-in operation excesses the threshold" are employed as the familiarity characteristic operation.

The individual operation history including the familiarity characteristic operation is subjected to grouping (step S507), whereas the individual operation history not including the familiarity characteristic operation is not subjected to grouping (step S505).

Incidentally, operation histories other than those of the present system can be referred to such familiarity characteristic operation. For example, it is possible to store operation histories of three-dimensional CG, etc. in a database.

Further, in the present embodiment, in a case where either one of step S501 or step S503 satisfies the condition, grouping is performed. Still further, it is also possible that, in a case where both of step S501 and step S503 satisfy the condition, the grouping is performed.

Meanwhile, the specific operation may include only "playback stop by selecting a motion image region" and "zoom-in operation".

5. Second Embodiment

In the above-described embodiment, the free viewpoint motion image is generated by the user terminal but it is also possible to generate the free viewpoint motion image by a distribution device by giving viewpoint switching data to the distribution device and transmit the generated free viewpoint motion image to the user terminal. In this case, the free viewpoint motion image distribution system will have the following structure.

A free viewpoint picture data distribution system including:
 a distribution computer including:
  storage means for storing free viewpoint picture data capable of changing a viewpoint for viewing;
  projection image generating means for generating, when a viewpoint and a viewpoint direction is given, specific viewpoint motion image data viewed from the viewpoint and the viewpoint direction for the free viewpoint picture data; and
  distribution means for distributing the specific viewpoint motion image data to a user terminal; and
 the user terminal including:
  receiving means for receiving the specific viewpoint motion image data;
  display control means for causing the display means to display the specific viewpoint motion image data; and
  projection image changing means for giving to the distribution computer when a switching instruction for switching a viewpoint and a viewpoint direction is received from the user for the specific viewpoint motion image data displayed on the display means;
 wherein the distribution computer has user-specific operation data receiving means for receiving a history of the switching instruction as user-specific operation data, and
 the projection image generating means generates new specific viewpoint motion image data on the basis of the switching instruction and causes the distribution means to distribute the new specific viewpoint motion image data;
 wherein the distribution computer is further equipped with
 user-specific operation data storage means for storing the received user-specific operation data, and
 recommended display condition determining means for determining user-specific operation data having a characteristic trend among the plural pieces of the user-specific operation data as target user-specific operation data for generating a recommended display condition, and for determining representative user-specific operation data on the basis of the target user-specific operation data, and
 wherein the distribution means distributes the specific viewpoint motion image data on the basis of the recommended display condition.

6. Other Embodiment

The zoom processing is not essential in the present embodiment.

Further, in the present embodiment, a case where a viewpoint and a viewpoint direction are changed sequentially at an elapsed time t0 has been described. It is possible to playback, after switching, the motion image with the viewpoint and the viewpoint direction from a start of playback. It is also possible that the user can select, after confirming whether or not a projection image is generated under the condition that is set from first, whether the user will switch the viewpoint while playing back the motion image or the user will switch the viewpoint from first. It is thereby not necessary for the user to change the viewpoint and the viewpoint direction in the way of viewing.

Further, in the present embodiment, the viewpoint coordinates and the viewpoint directions $\theta$ and $\varphi$ are stored. The data thereof may be formed into any format as far as the data can directly or indirectly specify the projection image viewed from which viewpoint and which direction.

Still further, in the present embodiment, one recommended viewpoint is supplied. The following is also possible that a motion image viewed from a plurality of viewpoints for a free viewpoint motion image is displayed on a screen and a user can change a combination of images composing the motion image by using the user terminal. Storage of such histories enables switching of even a composition of the free viewpoint motion image.

In the above-described embodiment, processing of the user terminal was executed by a browser program. It is also possible to load dedicated hardware or dedicated software.

Further, the user terminal is not necessarily a personal computer but may be a cellular phone, etc.

In the above-described embodiment, in order to realize the function illustrated in FIG. 1, a CPU is used to drive software for realizing the function. The function may be partially or entirely realized by hardware such as a logic circuit.

Incidentally, it is also possible that the program is partially executed by an operating system (OS).

Further, the parameter is represented by a value and the similarity in vectors in n dimensions is operated. It is also possible that the change of an image is stored to make a determination on the basis of the similarity in static images at the same relative times. At the time, it is not necessary to pay attention to the entire image but may pay attention to only a specific target. Examples of the image to be focused include a moving ball and moving members in a soccer game.

Incidentally, in the present embodiment, a case where an image-based rendering was employed for a free viewpoint image was described. It is also possible to apply a technique for generating a free viewpoint image with the other data structure in a similar manner. For example, a technique disclosed in JP 2014-056466 A (US2014071131 (A1)) may be employed.

In the above description, the present invention was described only in the form of preferred embodiments, so that technical terms were used only for the purpose of description of the present invention. The technical terms may be changed within the scope of attached claims without departing from the spirit of the present invention.

The invention claimed is:

1. A free viewpoint picture data distribution system comprising:
a distribution computer including:
a CPU; and
storage that stores free viewpoint picture data capable of changing a viewpoint for viewing, the distribution computer distributes the free viewpoint picture data to a user terminal, wherein the user terminal receives the free viewpoint picture data, generates, when projection characteristic data including a viewpoint and a viewpoint direction is given, specific viewpoint motion image data viewed from the viewpoint and the viewpoint direction for the free viewpoint picture data, displays the generated specific viewpoint motion image data, and causes, when projection characteristic changing data for changing a projection characteristic for the specific viewpoint motion image data displayed on the display means is given from an operator of the user terminal, generation of specific viewpoint motion image data based on the projection characteristic changing data, and sends a history of the projection characteristic changing data to the distribution computer,
wherein the distribution computer further receives the history of the projection characteristic changing data as user-specific operation data, stores the received user-specific operation data, determines user-specific operation data having a characteristic operation trend common in the plural pieces of user-specific operation data as target user-specific operation data for generating a recommended display condition, and determines representative user-specific operation data on the basis of the target user-specific operation data, wherein the recommended display condition is distributed together with the free viewpoint picture data,
wherein, at a relative elapsed time from a start of playback, if a viewpoint change history matches among the plural pieces of user-specific operation data, such user-specific operation data is determined as the target user-specific operation data, and
wherein, if a change history of the viewpoint direction also matches in addition to the viewpoint change history, such user-specific operation data is determined as the target user-specific operation data.

2. The free viewpoint picture data distribution system according to claim 1,
wherein, if viewpoint change timing matches in a relative elapsed time from a start of playback, such user-specific operation data is determined as the target user-specific operation data.

3. The free viewpoint picture data distribution system according to claim 1,
wherein, if at least one combination of a viewpoint and a viewpoint direction matches in a relative elapsed time from a start of playback among the plural pieces of user-specific operation data, such user-specific operation data is determined as the target user-specific operation data.

4. The free viewpoint picture data distribution system according to according to claim 1,
wherein, at a relative elapsed time from a start of playback, if zoom processing is performed at the same relative elapsed time among the plural pieces of user-specific operation data, such user-specific operation data is determined as the target user-specific operation data.

5. The free viewpoint picture data distribution system according to claim 1,
wherein, at a relative elapsed time from a start of playback, if timing for changing a playback speed matches among the plural pieces of user-specific operation data, such user-specific operation data is determined as the target user-specific operation data.

6. The free viewpoint picture data distribution system according to claim 1,
wherein user-specific operation data of a user whose total number of pieces of user-specific operation data stored excesses a predetermined value is determined as the target user-specific operation data.

7. The free viewpoint picture data distribution system according to claim 1,
wherein user-specific operation data of a user whose total number of pieces of user-specific operation data among the user-specific operation data related to specific motion image data excesses a predetermined value is determined as the target user-specific operation data.

8. A free viewpoint picture data distribution system comprising:
a distribution computer including:
a CPU; and
storage that stores free viewpoint picture data capable of changing a viewpoint for viewing, the distribution computer distributes the free viewpoint picture data to a user terminal, wherein the user terminal receives the free viewpoint picture data, generates, when projection characteristic data including a viewpoint and a viewpoint direction is given, specific viewpoint motion image data viewed from the viewpoint and the viewpoint direction for the free viewpoint picture data, displays the generated specific viewpoint motion image data, and causes, when projection characteristic changing data for changing a projection characteristic for the specific viewpoint motion image data displayed on the display means is given from an operator of the user terminal, generation of specific viewpoint motion image data based on the projection characteristic changing data, and sends a history of the projection characteristic changing data to the distribution computer, wherein the distribution computer further receives the history of the projection characteristic changing data as user-specific operation data, stores the received user-specific operation data, determines user-specific operation data having a characteristic operation trend common in the plural pieces of user-specific operation data as target user-specific operation data for generating a recommended display condition, and determines representative user-specific operation data on the basis of the target user-specific operation data, wherein the recommended display condition is distributed together with the free viewpoint picture data, wherein user-specific operation data including a specific operation is determined as the target user-specific operation data, and the specific operation is a zoom-in operation, and further wherein the specific operation takes more than a predetermined time period for the total operating time after the zoom-in operation.

9. The free viewpoint picture data distribution system according to claim 8,
wherein, if viewpoint change timing matches in a relative elapsed time from a start of playback, such user-specific operation data is determined as the target user-specific operation data.

10. The free viewpoint picture data distribution system according to claim 8,
wherein, if at least one combination of a viewpoint and a viewpoint direction matches in a relative elapsed time from a start of playback among the plural pieces of user-specific operation data, such user-specific operation data is determined as the target user-specific operation data.

11. The free viewpoint picture data distribution system according to according to claim 8,
wherein, at a relative elapsed time from a start of playback, if zoom processing is performed at the same relative elapsed time among the plural pieces of user-specific operation data, such user-specific operation data is determined as the target user-specific operation data.

12. The free viewpoint picture data distribution system according to claim 8,
wherein, at a relative elapsed time from a start of playback, if timing for changing a playback speed matches among the plural pieces of user-specific operation data, such user-specific operation data is determined as the target user-specific operation data.

13. The free viewpoint picture data distribution system according to claim 8,
wherein user-specific operation data of a user whose total number of pieces of user-specific operation data stored excesses a predetermined value is determined as the target user-specific operation data.

14. The free viewpoint picture data distribution system according to claim 8,
wherein user-specific operation data of a user whose total number of pieces of user-specific operation data among the user-specific operation data related to specific motion image data excesses a predetermined value is determined as the target user-specific operation data.

15. A free viewpoint picture data distribution system comprising:
a distribution computer including:
A CPU; and
storage that stores free viewpoint picture data capable of changing a viewpoint for viewing, a distribution computer generates, when a viewpoint and a viewpoint direction is given, specific viewpoint motion image data viewed from the viewpoint and the viewpoint direction for the free viewpoint picture data and distributes the specific viewpoint motion image data to a user terminal, wherein the user terminal receives the specific viewpoint motion image data and displays the specific viewpoint motion image data, gives a switching instruction to the distribution computer when an instruction to switch a viewpoint and a viewpoint direction for the specific viewpoint motion image data displayed is given from a user, wherein the distribution computer receives a history of the switching instruction as user-specific operation data, generates new specific viewpoint motion image data on the basis of the switching instruction and causes the distribution means to distribute the generated new specific viewpoint motion image data; and wherein the distribution computer further:

stores the received user-specific operation data; and determines user-specific operation data having a characteristic operation trend common in the plural pieces of user-specific operation data as target user-specific operation data for generating a recommended display condition, and for determining representative user-specific operation data on the basis of the target user-specific operation data; and wherein the distribution means distributes the specific viewpoint motion image data on the basis of the recommended display condition, wherein, at a relative elapsed time from a start of playback, if a viewpoint change history matches among the plural pieces of user-specific operation data, such user-specific operation data is determined as the target user-specific operation data, and wherein, if a change history of the viewpoint direction also matches in addition to the viewpoint change history, such user-specific operation data is determined as the target user-specific operation data.

16. The free viewpoint picture data distribution system according to claim 15,
wherein, if viewpoint change timing matches in a relative elapsed time from a start of playback, such user-specific operation data is determined as the target user-specific operation data.

17. The free viewpoint picture data distribution system according to claim 15,
wherein, if at least one combination of a viewpoint and a viewpoint direction matches in a relative elapsed time from a start of playback among the plural pieces of user-specific operation data, such user-specific operation data is determined as the target user-specific operation data.

18. The free viewpoint picture data distribution system according to according to claim 15,
wherein, at a relative elapsed time from a start of playback, if zoom processing is performed at the same relative elapsed time among the plural pieces of user-specific operation data, such user-specific operation data is determined as the target user-specific operation data.

19. The free viewpoint picture data distribution system according to claim 15,
wherein, at a relative elapsed time from a start of playback, if timing for changing a playback speed matches among the plural pieces of user-specific operation data, such user-specific operation data is determined as the target user-specific operation data.

20. The free viewpoint picture data distribution system according to claim 15,
wherein user-specific operation data of a user whose total number of pieces of user-specific operation data stored excesses a predetermined value is determined as the target user-specific operation data.

21. The free viewpoint picture data distribution system according to claim 15,
wherein user-specific operation data of a user whose total number of pieces of user-specific operation data among the user-specific operation data related to specific motion image data excesses a predetermined value is determined as the target user-specific operation data.

22. A free viewpoint picture data distribution system comprising:
a distribution computer including:
A CPU; and
storage that stores free viewpoint picture data capable of changing a viewpoint for viewing, a distribution computer generates, when a viewpoint and a viewpoint direction is given, specific viewpoint motion image data viewed from the viewpoint and the viewpoint direction for the free viewpoint picture data and distributes the specific viewpoint motion image data to a user terminal, wherein the user terminal receives the specific viewpoint motion image data and displays the specific viewpoint motion image data, gives a switching instruction to the distribution computer when an instruction to switch a viewpoint and a viewpoint direction for the specific viewpoint motion image data displayed is given from a user,
wherein the distribution computer receives a history of the switching instruction as user-specific operation data, generates new specific viewpoint motion image data on the basis of the switching instruction and causes the distribution means to distribute the generated new specific viewpoint motion image data; and
wherein the distribution computer further:
stores the received user-specific operation data; and
determines user-specific operation data having a characteristic operation trend common in the plural pieces of user-specific operation data as target user-specific operation data for generating a recommended display condition, and for determining representative user-specific operation data on the basis of the target user-specific operation data; and
wherein the distribution means distributes the specific viewpoint motion image data on the basis of the recommended display condition,
wherein user-specific operation data including a specific operation is determined as the target user-specific operation data, and the specific operation is a zoom-in operation, and further wherein the specific operation takes more than a predetermined time period for the total operating time after the zoom-in operation.

23. The free viewpoint picture data distribution system according to claim 22,
wherein, if viewpoint change timing matches in a relative elapsed time from a start of playback, such user-specific operation data is determined as the target user-specific operation data.

24. The free viewpoint picture data distribution system according to claim 22,
wherein, if at least one combination of a viewpoint and a viewpoint direction matches in a relative elapsed time from a start of playback among the plural pieces of user-specific operation data, such user-specific operation data is determined as the target user-specific operation data.

25. The free viewpoint picture data distribution system according to according to claim 22,
wherein, at a relative elapsed time from a start of playback, if zoom processing is performed at the same relative elapsed time among the plural pieces of user-specific operation data, such user-specific operation data is determined as the target user-specific operation data.

26. The free viewpoint picture data distribution system according to claim 22,
wherein, at a relative elapsed time from a start of playback, if timing for changing a playback speed matches among the plural pieces of user-specific operation data, such user-specific operation data is determined as the target user-specific operation data.

27. The free viewpoint picture data distribution system according to claim 22,
wherein user-specific operation data of a user whose total number of pieces of user-specific operation data stored excesses a predetermined value is determined as the target user-specific operation data.

28. The free viewpoint picture data distribution system according to claim 22,
wherein user-specific operation data of a user whose total number of pieces of user-specific operation data among the user-specific operation data related to specific motion image data excesses a predetermined value is determined as the target user-specific operation data.

* * * * *